(12) United States Patent
Kawamura et al.

(10) Patent No.: US 12,122,318 B2
(45) Date of Patent: Oct. 22, 2024

(54) AIRBAG DEVICE

(71) Applicant: TOYODA GOSEI CO., LTD., Kiyosu (JP)

(72) Inventors: Yusuke Kawamura, Kiyosu (JP); Keigo Kimura, Kiyosu (JP); Koji Kawamura, Kiyosu (JP); Hajime Kitte, Kiyosu (JP); Yoshio Ono, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/524,773

(22) Filed: Nov. 30, 2023

(65) Prior Publication Data

US 2024/0092307 A1 Mar. 21, 2024

Related U.S. Application Data

(63) Continuation of application No. 18/058,328, filed on Nov. 23, 2022, now Pat. No. 11,865,997.

(30) Foreign Application Priority Data

Dec. 17, 2021 (JP) .................................. 2021-205474

(51) Int. Cl.
*B60R 21/239* (2006.01)
*B60R 21/203* (2006.01)
*B60R 21/2338* (2011.01)

(52) U.S. Cl.
CPC .......... *B60R 21/239* (2013.01); *B60R 21/203* (2013.01); *B60R 21/2338* (2013.01);
(Continued)

(58) Field of Classification Search
CPC .. B60R 2021/2395; B60R 2021/23384; B60R 2021/23388; B60R 2021/23382;
(Continued)

(56) References Cited

U.S. PATENT DOCUMENTS

| 7,925,403 | B2 | 4/2011 | Kumagai et al. |
| 7,938,444 | B2 | 5/2011 | Williams et al. |

(Continued)

FOREIGN PATENT DOCUMENTS

| DE | 102008028921 A1 | 12/2009 |
| DE | 102013002363 A1 | 8/2014 |

(Continued)

*Primary Examiner* — Keith J Frisby
(74) *Attorney, Agent, or Firm* — Posz Law Group, PLC

(57) ABSTRACT

An actuator of an airbag device includes a main body portion, which is attached to an attachment base, and a cap including a fitting protruding portion that is inserted into a fitting recessed portion of the main body portion. The fitting protruding portion has a holding portion, which is inserted into a holding hole of a coupling member when fitted to the main body portion and holds a leading end portion of the coupling member, and a movement permitting unit that, when a ceiling portion of the cap is subjected to pressure of a combustion gas of a squib, causes the ceiling portion to move, and causes the holding portion to move from a holding position, wherein the holding portion is inserted into the holding hole of the coupling member, to a holding released position, wherein the holding portion is removed from the holding hole.

6 Claims, 17 Drawing Sheets

(52) U.S. Cl.
CPC ............... *B60R 2021/23384* (2013.01); *B60R 2021/2395* (2013.01)

(58) Field of Classification Search
CPC ...... B60R 2021/23386; B60R 21/2338; B60R 21/239; B60R 21/203; B60R 21/205
USPC .............................................. 280/739, 743.2
See application file for complete search history.

(56) References Cited

U.S. PATENT DOCUMENTS

| | | |
|---|---|---|
| 9,776,591 B1 | 10/2017 | Jeong et al. |
| 2005/0057027 A1 | 3/2005 | Fogle et al. |
| 2006/0163855 A1 | 7/2006 | Szidzek et al. |
| 2006/0290117 A1 | 12/2006 | Fischer et al. |
| 2009/0301339 A1 | 12/2009 | Ito et al. |
| 2010/0078924 A1 | 4/2010 | Mitsuo et al. |
| 2010/0187797 A1 | 7/2010 | Debler et al. |
| 2010/0201107 A1 | 8/2010 | Abe et al. |
| 2011/0109065 A1 | 5/2011 | Sauer |
| 2014/0175776 A1 | 6/2014 | Muller et al. |
| 2014/0339799 A1 | 11/2014 | Englbrecht et al. |
| 2017/0158161 A1 | 6/2017 | Gammill |
| 2021/0061215 A1 | 3/2021 | Debler et al. |
| 2021/0086716 A1 | 3/2021 | Hill |
| 2023/0013077 A1 | 1/2023 | Horton et al. |

FOREIGN PATENT DOCUMENTS

| | | |
|---|---|---|
| DE | 102013013177 A1 | 2/2015 |
| EP | 1769978 A1 | 4/2007 |
| JP | 2009-293785 A | 12/2009 |
| JP | 2012176706 A | 9/2012 |
| KR | 20140035140 A | 3/2014 |
| WO | 2014/106567 A1 | 7/2014 |
| WO | 2022/233477 A1 | 11/2022 |

AIRBAG DEVICE

CROSS-REFERENCE TO RELATED APPLICATIONS

The present application is a continuation application of U.S. application Ser. No. 18/058,328, filed on Nov. 23, 2022, which is based on and claims priority from Japanese Patent Application No. 2021-205474 of Kawamura et al., filed on Dec. 17, 2021, the disclosures of which are hereby incorporated into the present application by reference.

BACKGROUND

Technical Field

The present invention relates to an airbag device such that an internal pressure of an airbag when inflating can be adjusted by discharging an inflating gas from an internal pressure adjustment exhaust hole provided in a peripheral wall of the airbag.

An existing configuration including an airbag having an exhaust hole through which an inflating gas can be discharged to adjust internal pressure in a peripheral wall, a blocking member that can adjust the exhaust hole to a blocked state and an opened state, an actuator that maintains a state wherein the exhaust hole is blocked by holding a leading end portion side of a coupling member whose base portion side is coupled to the blocking member, and shifts the exhaust hole to an opened state by releasing the holding of the leading end portion side of the coupling member, and an attachment base that holds the airbag and the actuator, is known as an airbag device (for example, JP-A-2009-293785).

The actuator has a holding pin and a squib, and is configured in such a way as to hold the coupling member before operating by the holding pin being inserted into a holding hole formed in the leading end portion of the coupling member. Also, the actuator is configured in such a way as to cause the holding pin to slide utilizing a combustion gas emitted from the squib when operating, thereby removing the holding pin from the holding hole of the coupling member, and releasing the holding of the coupling member.

The actuator is configured in such a way that the holding pin is caused to protrude from a main body portion in which the squib is provided, and the holding pin is drawn in to the main body portion side when operating. In other words, the actuator is a piston cylinder type, and includes, in the main body portion, a gas inflow chamber that acts as a cylinder into which combustion gas emitted from the squib is caused to flow, wherein a piston portion extending from the holding pin is provided inside the gas inflow chamber, and the holding pin is drawn into the gas inflow chamber (into the main body portion) when the combustion gas flows into the gas inflow chamber.

However, as this piston cylinder type of actuator is configured in such a way that the piston portion extending from the holding pin is caused to slide inside the cylinder, there is a need for a holding pin sliding mechanism that takes into consideration combustion gas airtightness and a sliding performance of the piston portion inside the cylinder, the actuator configuration becomes more complex, and a problem relating to weight reduction and size reduction arises.

SUMMARY

An object of the invention is to cause a holding of a coupling member by an actuator in an airbag device to be released using a simple configuration.

A representative configuration of an airbag device according to the invention is as follows.

The airbag device includes:
an airbag having, in a peripheral wall, an exhaust hole through which an inflating gas can be discharged in order to adjust internal pressure;
a blocking member that can adjust the exhaust hole to a blocked state and an opened state;
a coupling member that has flexibility and whose base portion side is coupled to the blocking member;
an actuator, which maintains a state of blocking the exhaust hole by holding a leading end portion side of the coupling member, and causes a shift to a state of opening the exhaust hole by releasing the holding of the leading end portion side of the coupling member; and
an attachment base that holds the airbag and the actuator, wherein
the actuator includes:
a main body portion attached to the attachment base;
a squib provided on one end side inside the main body portion; and
a cap, attached to another end side of the main body portion in such a way as to oppose the squib, that includes a ceiling portion, which is provided in such a way as to close off the other end side of the main body portion and is subjected to pressure of a combustion gas emitted when the squib operates, and a fitting protruding portion, which extends to the main body portion side from the ceiling portion, and regulates movement of the cap in a removal direction opposite to an insertion direction by being inserted into a fitting recessed portion provided on the other end side of the main body portion, thereby attaching the cap to the main body portion, and wherein
the fitting protruding portion includes:
a fitting main body portion fitted in the fitting recessed portion of the main body portion;
a holding portion, which is inserted into a holding hole formed in the coupling member disposed between the ceiling portion and the other end of the main body portion when fitted to the main body portion, and holds the leading end portion of the coupling member by engaging with an inner peripheral edge side of the holding hole; and
a movement permitting unit that, when the ceiling portion is subjected to the pressure of the combustion gas, causes the ceiling portion to move, and causes the holding portion to move from a holding position, wherein the holding portion is inserted into the holding hole of the coupling member, to a holding released position, wherein the holding portion is removed from the holding hole.

DETAILED DESCRIPTION

Preferred embodiments of the present invention are described below with reference to accompanying drawings. However, the invention is not limited to the embodiments disclosed herein. All modifications within the appended claims and equivalents relative thereto are intended to be encompassed in the scope of the claims.

Figure 1:
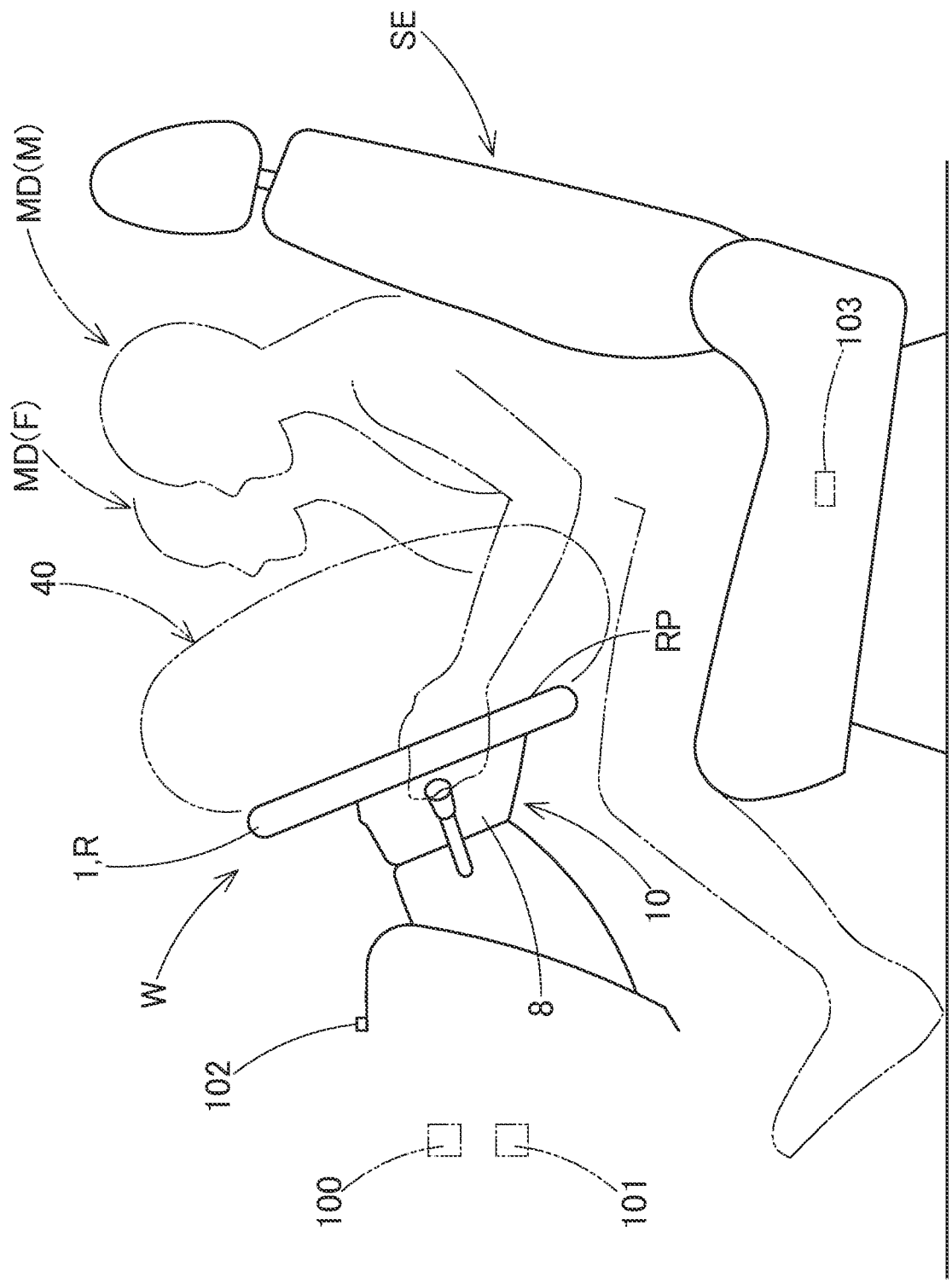
FIG. 1 is a side view showing a state in which an airbag device of an embodiment is mounted in a vehicle, wherein an airbag when inflation is completed is indicated by two-dot chain lines.
Figure 2:
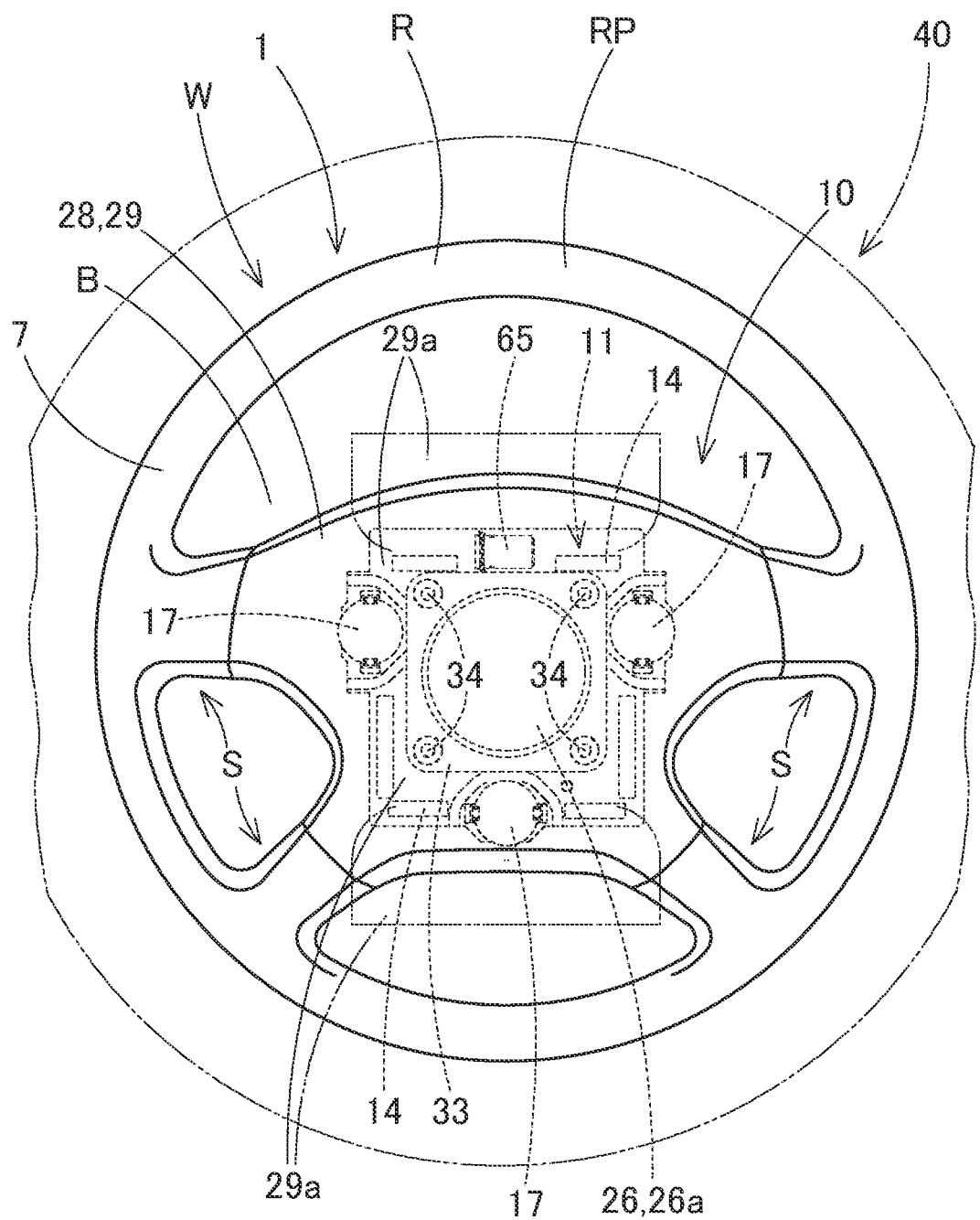
FIG. 2 is a schematic plan view of a steering wheel on which the airbag device is mounted.
Figure 3:
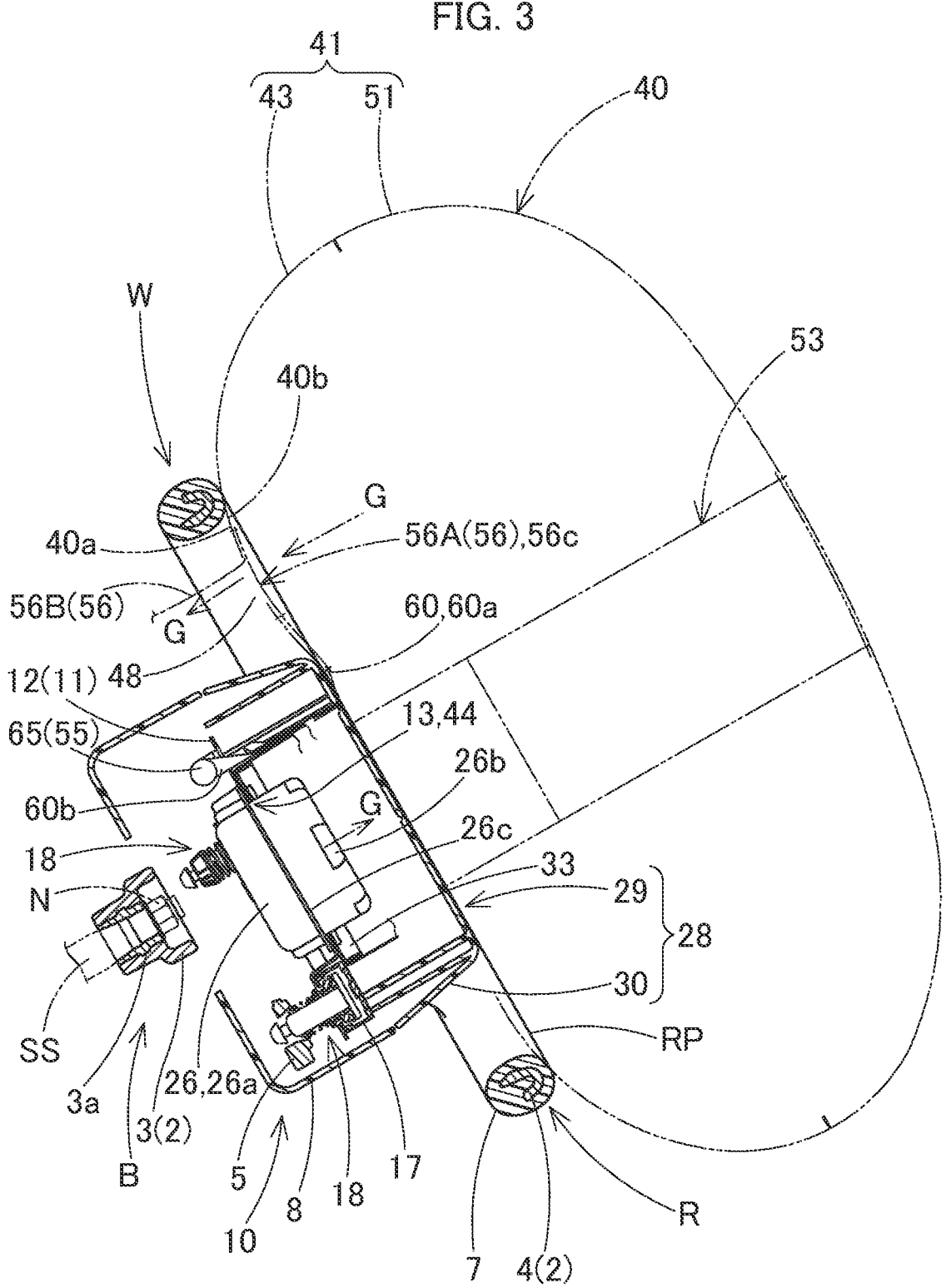
FIG. 3 is a schematic longitudinal sectional view of the steering wheel on which the airbag device is mounted.

Hereafter, one embodiment of the invention will be described, using the drawings. An airbag device 10 of the present embodiment is a driver's seat airbag device 10 mounted to a steering wheel W, as shown in FIGS. 1, 2, and 3. The steering wheel W includes a steering wheel main body 1 and the airbag device 10, which is disposed on an upper portion of a boss portion B in a center of the steering wheel main body 1. The steering wheel main body 1 includes a circular ring portion R, which is gripped when steering, the boss portion B, which is disposed in a center of the ring portion R and fastened to a steering shaft SS, and four spoke portions S that couple the boss portion B and the ring portion R.

In the following description, unless specifically stated otherwise, an up-down direction corresponds to an up-down direction along an axial direction of the steering shaft SS, a front-back direction corresponds to a front-back direction perpendicular to the axial direction of the steering shaft SS when a vehicle is steered straight ahead, and a left-right direction corresponds to a left-right direction perpendicular to the axial direction of the steering shaft SS when the vehicle is steered straight ahead.

The vehicle has a control device 100 that controls an operation of the airbag device 10, a collision detecting sensor 101 that detects a collision, a position detecting sensor 102 that detects a position of an occupant (driver) MD (M, F) seated in a seat SE, and a weight detecting sensor 103 that detects a body weight of the occupant (driver) MD (M, F). On detecting a collision of the vehicle based on a signal output from the collision detecting sensor 101, the control device 100 causes an inflator 26 to operate in order to cause an airbag 40 of the airbag device 10 to inflate. At this time, when determining, based on signals output from the position detecting sensor 102 and the weight detecting sensor 103, that an internal pressure of the airbag 40 is not to be reduced, the control device 100 controls in such a way as not to cause an actuator 65 of an internal pressure adjusting mechanism 55 to operate. Also, when determining, based on signals output from the position detecting sensor 102 and the weight detecting sensor 103, that the internal pressure of the airbag 40 is to be reduced, the control device 100 controls in such a way as to cause the actuator 65 of the internal pressure adjusting mechanism 55 to operate. For example, when the body weight of the driver MD (F) is light, or when the driver MD (F) is in proximity to the steering wheel W, the control device 100 determines that the internal pressure of the airbag 40 is to be reduced, and causes the actuator 65 to operate, thereby causing an inflating gas to be discharged from the airbag 40 in order to reduce the internal pressure of the airbag 40. For example, when the body weight of the driver MD (F) is heavy, or when the driver MD (F) is distanced from the steering wheel W, the control device 100 determines that the internal pressure of the airbag 40 is not to be reduced, and maintains the internal pressure of the airbag 40 without causing the actuator 65 to operate.

As shown in FIGS. 1, 2, and 3, the steering wheel main body 1 includes a metal core member 2, of an aluminum alloy or the like, that couples the ring portion R, the boss portion B, and the spoke portion S. A region of the core member 2 in the ring portion R (a ring core member portion 4) and a region on the ring portion R side of each spoke portion S are covered with a cover layer 7 made of a synthetic resin. A steel boss 3a for inserting the steering shaft SS and fixing with a nut N is disposed in a boss core member portion 3 of the core member 2 in the boss portion B. Also, a lower cover 8 made of a synthetic resin, which covers a portion below the boss portion B, is disposed in a lower portion of the steering wheel main body 1.

The driver's seat airbag device 10 includes the airbag 40, which is folded and housed, and which inflates owing to inflating gas being caused to flow thereinto in such a way as to be capable of protecting the driver MD (M, F), the inflator 26, which supplies inflating gas to the airbag 40, an airbag cover 28 that covers a portion above the folded airbag 40, an attachment base 11 that holds the airbag 40, the inflator 26, and the airbag cover 28, and a retainer 33 for attaching the airbag 40 to the attachment base 11 together with the inflator 26. Also, the airbag device 10 includes the internal pressure adjusting mechanism 55, which can adjust the internal pressure of the inflated airbag 40. The internal pressure adjusting mechanism 55 includes a blocking member 56, a blocking tether 60 acting as a coupling member coupled to the blocking member 56, and the actuator 65, which acts as a holding and releasing unit that carries out a holding and a releasing of a holding of the blocking tether 60.

The retainer 33 is a metal plate of a quadrilateral ring form. The retainer 33 is configured to include a bolt 34 fixed with a nut to the attachment base 11 in each of four corners (refer to FIG. 2) in such a way as to attach the airbag 40 to the attachment base 11 by suppressing a peripheral edge of an inflow aperture 44, to be described hereafter, of the airbag 40, and to attach the inflator 26 to the attachment base 11.

The inflator 26 includes a cylindrical main body portion 26a, which includes a multiple of gas discharge ports 26b in an upper portion thereof, and a flange portion 26c protruding from an outer peripheral face of the main body portion 26a. Through holes (not shown) through which the bolts 34 of the retainer 33 are caused to pass are formed in the flange portion 26c.

As shown in FIGS. 2, 3, 5, 7A, 7B, 11A and 11B, the attachment base 11 is a metal plate of an approximately rectangular form, is disposed in an upper portion of the boss portion B of the steering wheel W, and is a member to which the folded airbag 40, the inflator 26, the airbag cover 28, and the actuator 65 are attached. The attachment base 11 includes a base main body portion 12, to which the airbag 40, the inflator 26, and the airbag cover 28 are attached, and a base side attachment portion 20, which protrudes from a back face (lower face) 12b side of the base main body portion 12 and to which the actuator 65 can be attached.

An insertion hole 13 into which the main body portion 26a of the inflator 26 can be inserted from below is opened in a circular form in the base main body portion 12. Also, a through hole 15 through which the bolt 34 of the retainer 33 is passed is formed in a periphery of the insertion hole 13 of the base main body portion 12. Also, an engagement leg attachment seat 17, to which a multiple (three in the embodiment) of engagement legs 18 for attaching the airbag device 10 to an attachment portion 5 of the steering wheel main body 1 are attached, is provided in the base main body portion 12 (refer to FIGS. 2 and 3). Each engagement leg 18 attached to the engagement leg attachment seat 17 is configured in such a way as to incorporate a horn switch mechanism, and when an operation of pressing the airbag device 10 down is carried out after the airbag device 10 is attached to the steering wheel main body 1, a horn provided in the vehicle can be operated. Also, each engagement leg 18 attached to the engagement leg attachment seat 17 of the base main body portion 12 is attached to the attachment portion 5, which is provided in the boss core member portion 3 of the steering wheel main body 1. By so doing, the airbag device 10 is attached to the steering wheel main body 1.

Also, the base main body portion 12 includes a multiple of engagement holes 14 in which unshown engagement legs extending from a side wall portion 30 of the airbag cover 28 are engaged. The airbag cover 28 is held by the attachment base 11 by being engaged with the engagement holes 14. Also, an insertion hole 16 through which the blocking tether 60 is inserted is formed in a position in the peripheral edge of the insertion hole 13 distanced from the retainer 33 in the base main body portion 12. The blocking tether 60 is inserted from an upper face (front face) 12a side of the base main body portion 12, to which the folded airbag 40 is attached, to the lower face (back face) 12b side through the insertion hole 16.

The base side attachment portion 20 is provided on a front edge 12c side of the base main body portion 12. The base side attachment portion 20 is configured of a cutout 19 formed in the base main body portion 12, a peripheral wall portion 22, which protrudes from the lower face 12b of the base main body portion 12 and whose transverse section is of a reversed C form, and a lateral wall portion 23 of an approximately rectangular form, which is coupled to a lower end of the reversed C-form of the peripheral wall portion 22 in such a way as to block the cutout 19. A portion enclosed by the peripheral wall portion 22 and the lateral wall portion 23 configures an attachment recessed portion 21. As will be described hereafter, an attachment protruding portion 74 of a main body side attachment portion 72 of the actuator 65 is inserted into the attachment recessed portion 21 through an insertion aperture 21a of the attachment recessed portion 21. Also, the lateral wall portion 23 has an insertion groove portion 24 into which an attachment shaft portion 75 of the main body side attachment portion 72 is inserted. The insertion groove portion 24 opens from a front end 23b of the lateral wall portion 23, and includes a general portion 24a, whose aperture width dimension is approximately constant, and an engagement portion 24b, whose width dimension is partially increased.

The airbag cover 28 is made of a synthetic resin, and includes a ceiling wall portion 29, which covers a portion above the airbag 40 folded and housed, and the side wall portion 30, of an approximately square tube form, which extends downward from a vicinity of an outer peripheral edge of the ceiling wall portion 29. Two door portions 29a, which open at both front and back sides owing to being pushed by the inflating airbag 40, are formed in the ceiling wall portion 29 (refer to FIG. 2). As already described, engagement legs (not shown) engaged in the engagement holes 14 of the attachment base 11 are disposed at a lower end of the side wall portion 30.

The airbag 40 is formed of a fabric obtained by weaving strands of a polyamide, polyester, or the like. As indicated by two-dot chain lines in FIGS. 1 and 2, a form of the airbag 40 when inflation is completed is configured in such a way as to be circular when seen from above, and approximately elliptical when seen from a side. An outer peripheral wall 41 of the airbag 40 includes a vehicle body side wall portion 43 on the steering wheel main body 1 side (the ring portion R side) and a driver side wall portion 51 on the driver MD side.

The vehicle body side wall portion 43 and the driver side wall portion 51 are both circular, and have identical external forms. An inflow aperture 44 opened in a circular form, for causing inflating gas to flow in, is formed in a center of the vehicle body side wall portion 43 (refer to FIGS. 3 and 4). The outer peripheral wall 41 is formed by outer peripheral edges of the vehicle body side wall portion 43 and the driver side wall portion 51 being sewn together. Also, attachment holes 45 through which the bolts 34 of the retainer 33 for attaching the airbag 40 to the attachment base 11 are caused to pass are formed in a peripheral edge of the inflow aperture 44 (refer to FIG. 4).

Also, a multiple (two in the embodiment) of thickness regulating tethers 53 that couple the vehicle body side wall portion 43 and the driver side wall portion 51 are provided in the airbag 40 in order to regulate a distance between the vehicle body side wall portion 43 and the driver side wall portion 51 when inflating. The thickness regulating tether 53 extends from both left and right sides of the inflow aperture 44 of the vehicle body side wall portion 43, and is coupled to the driver side wall portion 51 side.

Also, two gas release holes 47 (vent holes) and an exhaust hole 48 (a variable vent hole) are provided in the vehicle body side wall portion 43. The gas release hole 47 is a hole for releasing inflating gas in order to restrict a sudden rise in internal pressure in the airbag 40 when inflating gas flows in, is disposed on the left and right on a front portion side of the vehicle body side wall portion 43, and is opened in a circular form. The exhaust hole 48 is a hole through which inflating gas can be discharged in order to adjust the internal pressure of the airbag 40 when inflating, is disposed in a left-right direction center on a front portion side of the inflow aperture 44, and is opened in a circular form. Furthermore, an insertion hole 49, which is a slit-form aperture through which the blocking tether 60 is inserted, is provided in a position between the exhaust hole 48 and the inflow aperture 44 in the vehicle body side wall portion 43.

Figure 4:
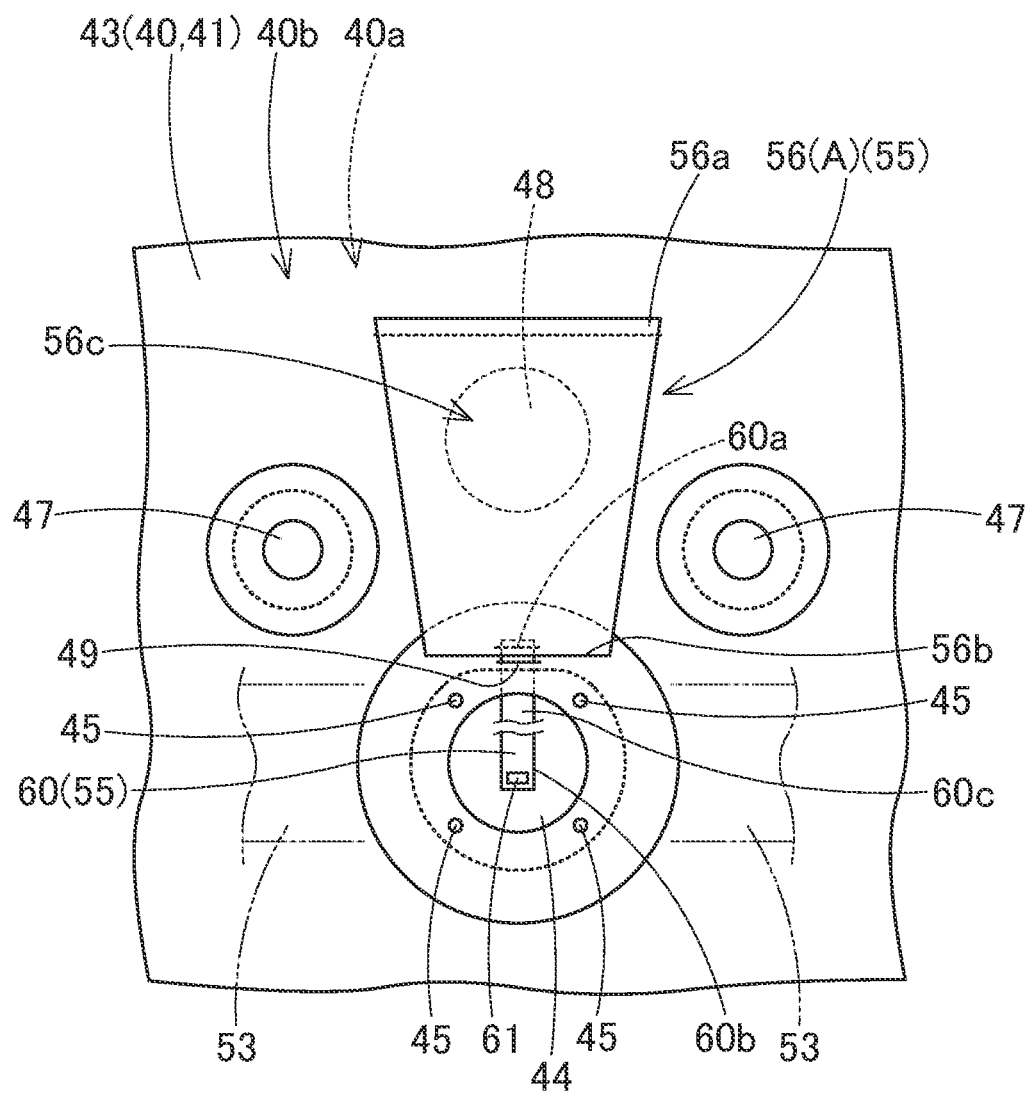
FIG. 4 is an exploded view of a blocking member seen from an inner peripheral face side of the airbag in a state wherein the airbag is flattened.
Figure 5:
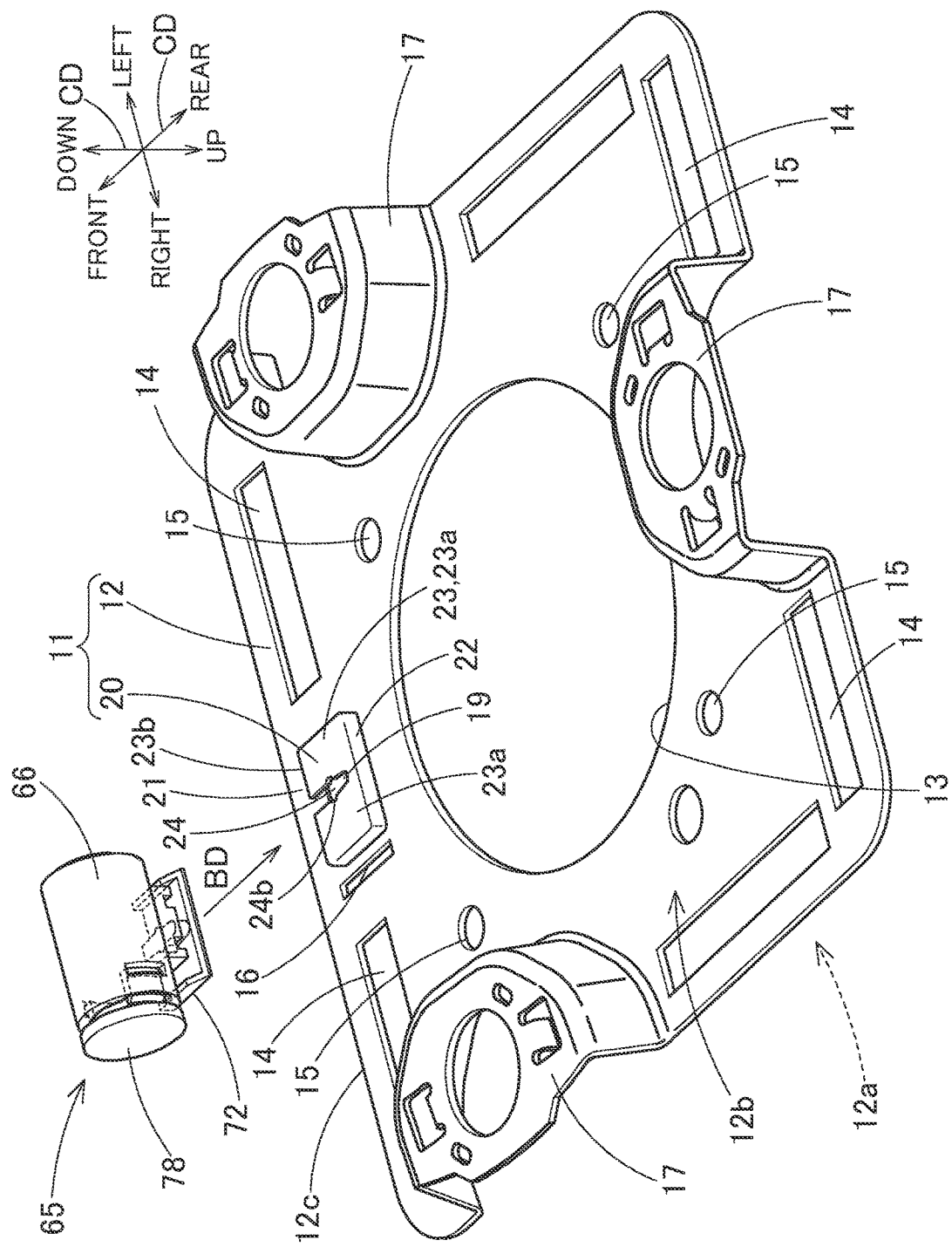
FIG. 5 is a schematic perspective view wherein an attachment base and an actuator are seen from a bottom face side.
Figure 6:
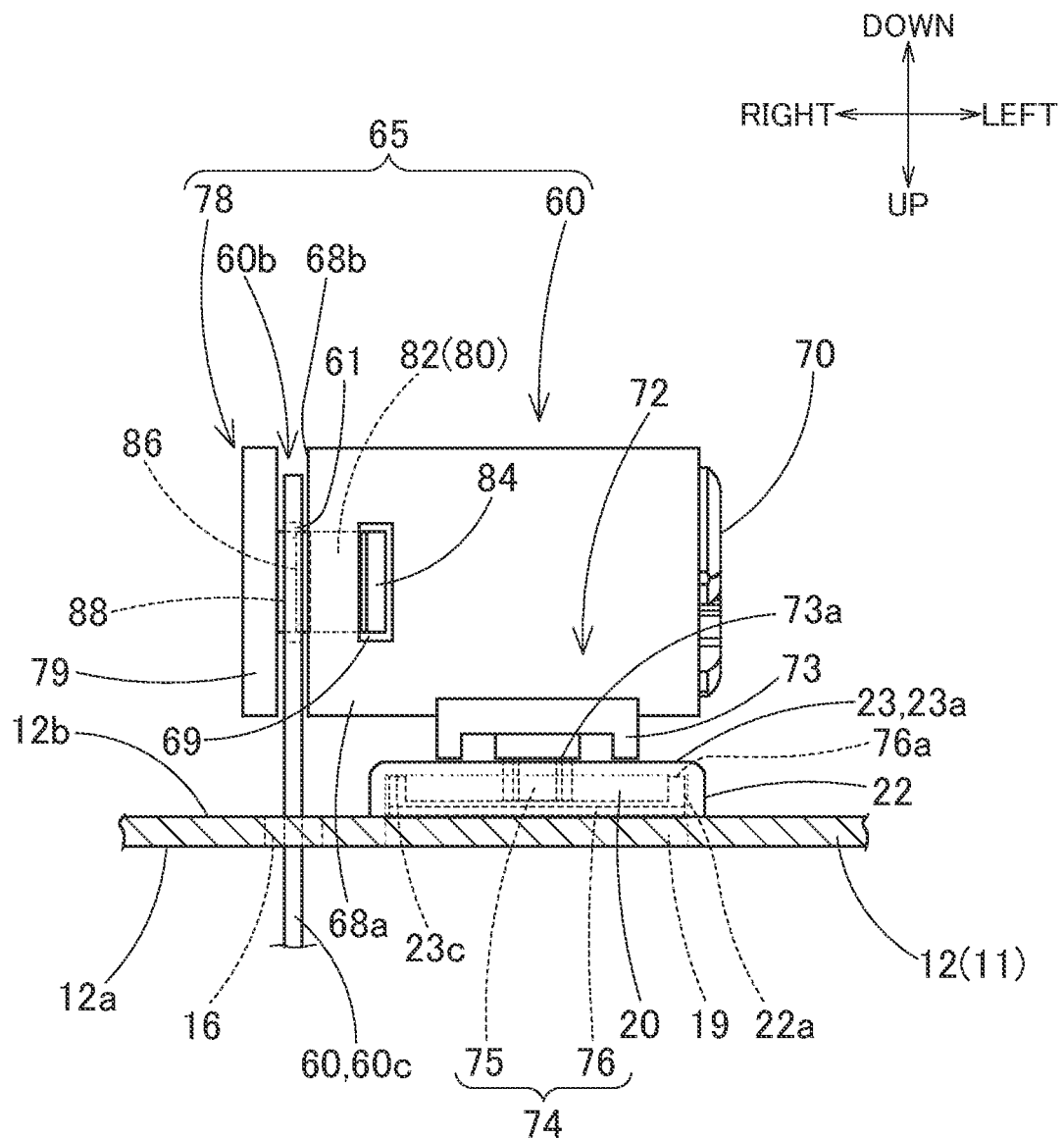
FIG. 6 is a schematic front view of the actuator to which a coupling member is coupled.
Figure 7A:
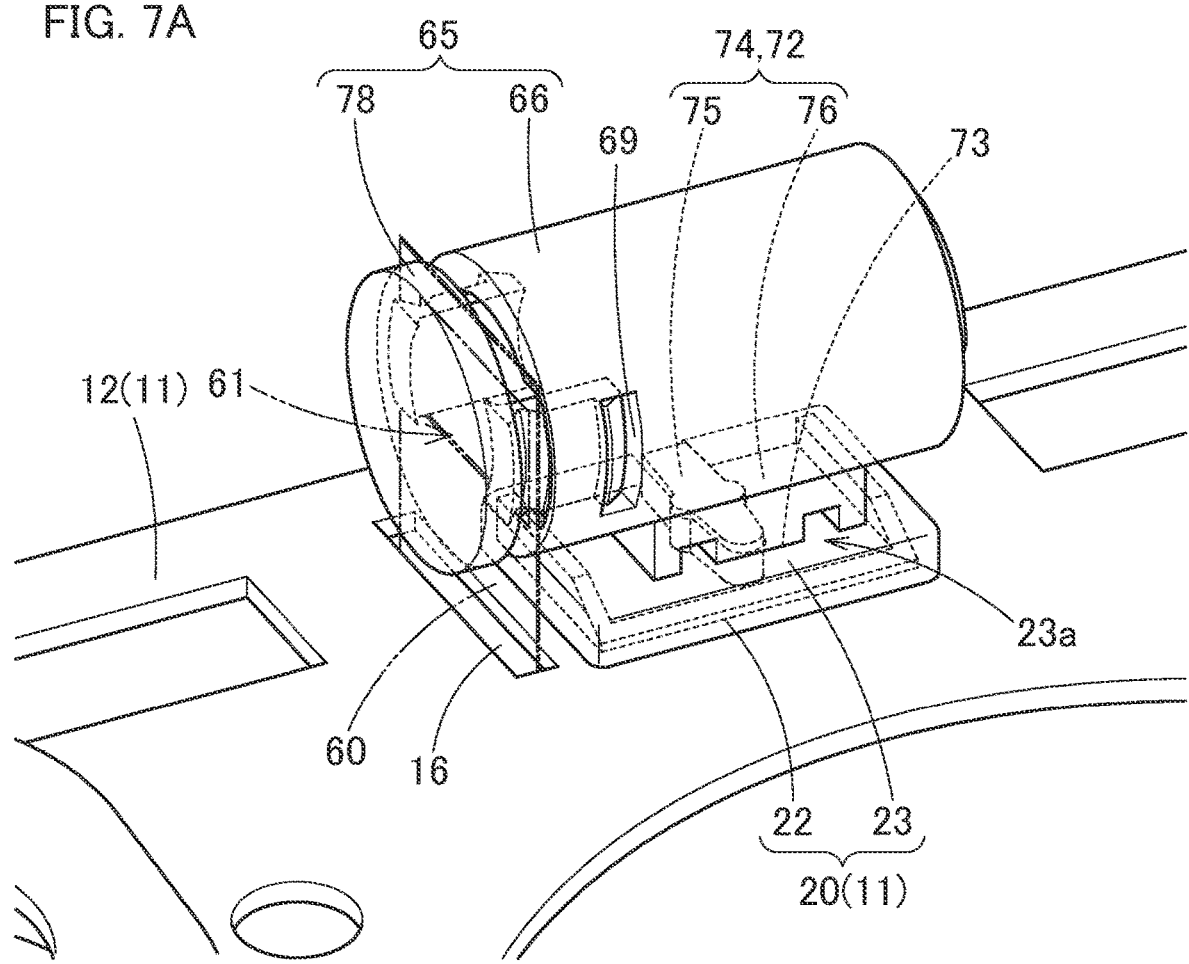
FIGS. 7A and 7B are schematic perspective views of the actuator to which the coupling member is coupled, together showing a state wherein a holding portion of a cap and the coupling member are coupled.
Figure 7B:
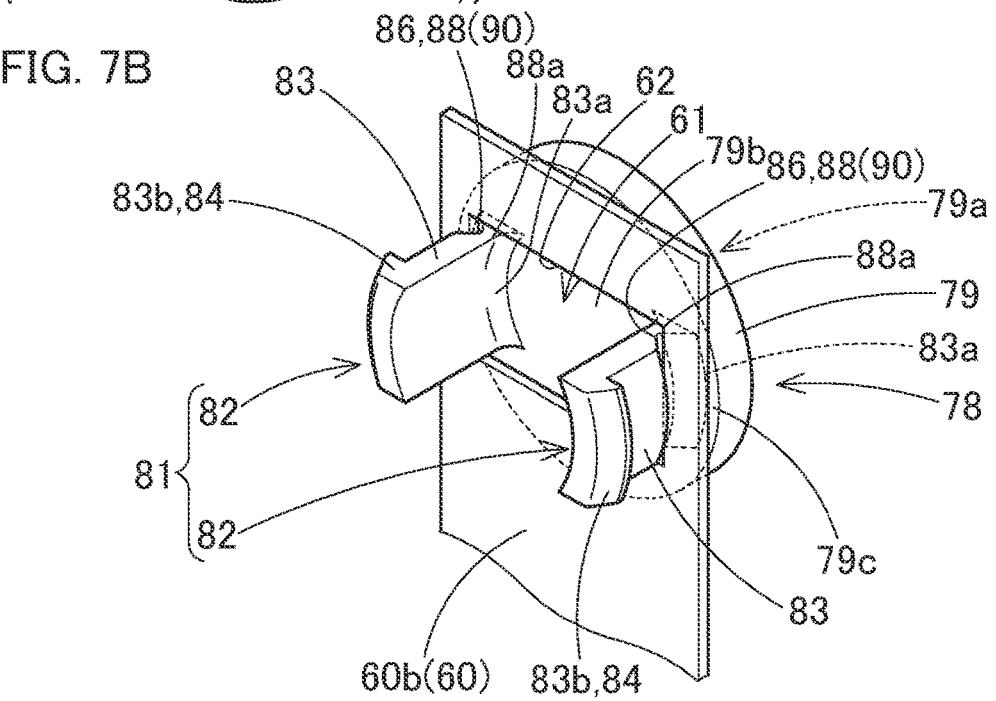
Figure 8:
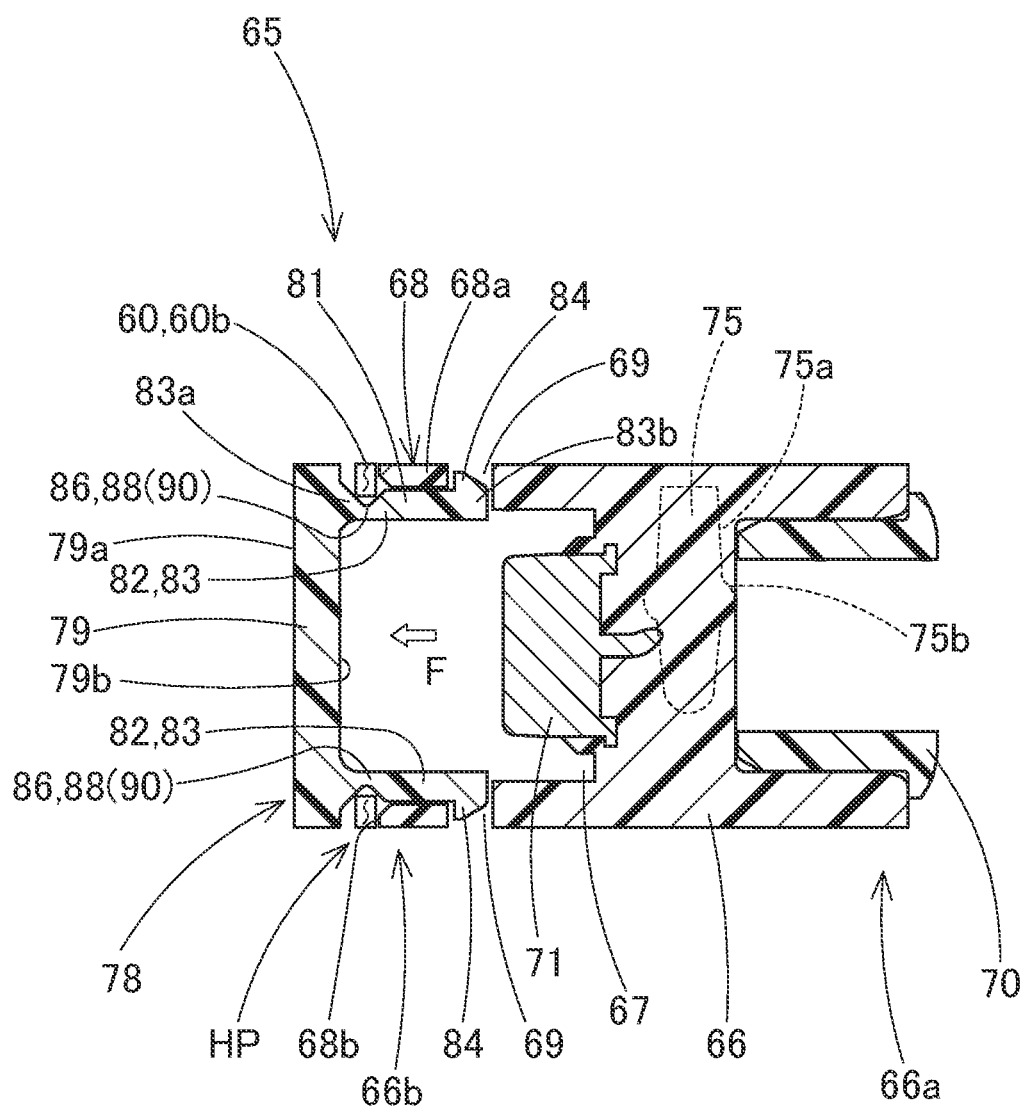
FIG. 8 is a schematic lateral sectional view of the actuator to which the coupling member is coupled.
Figure 9A:
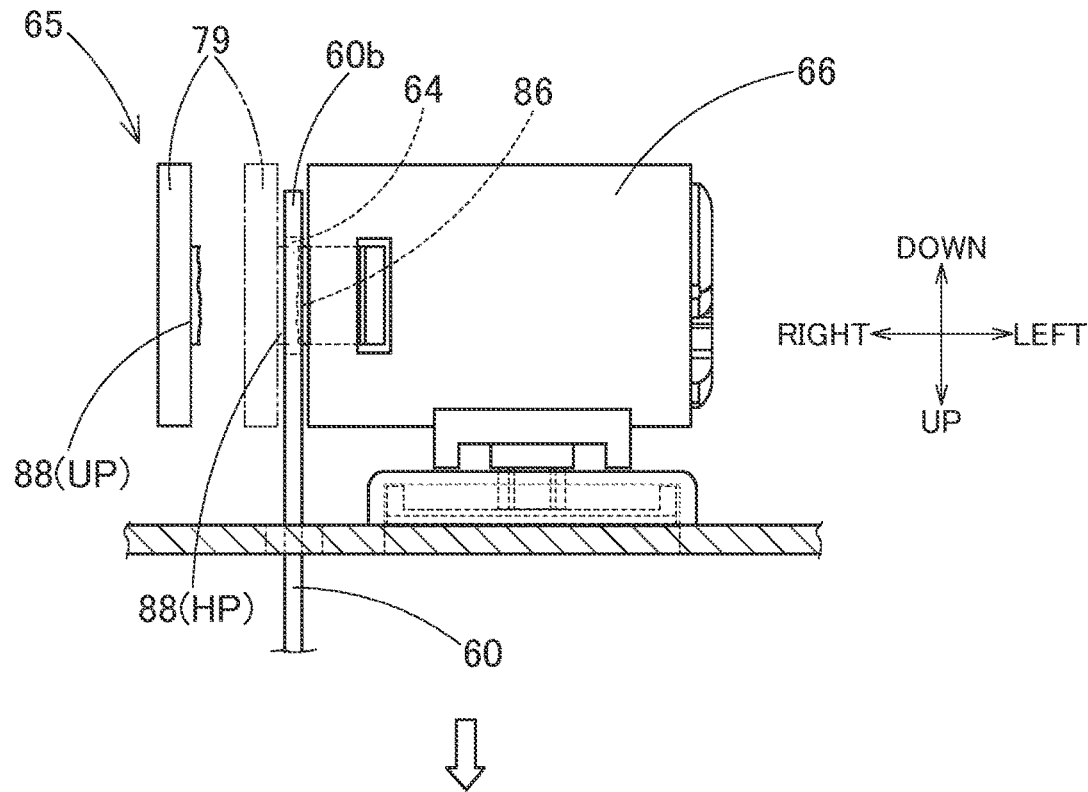
FIGS. 9A and 9B are schematic front views showing states before and after the actuator operates.
Figure 9B:
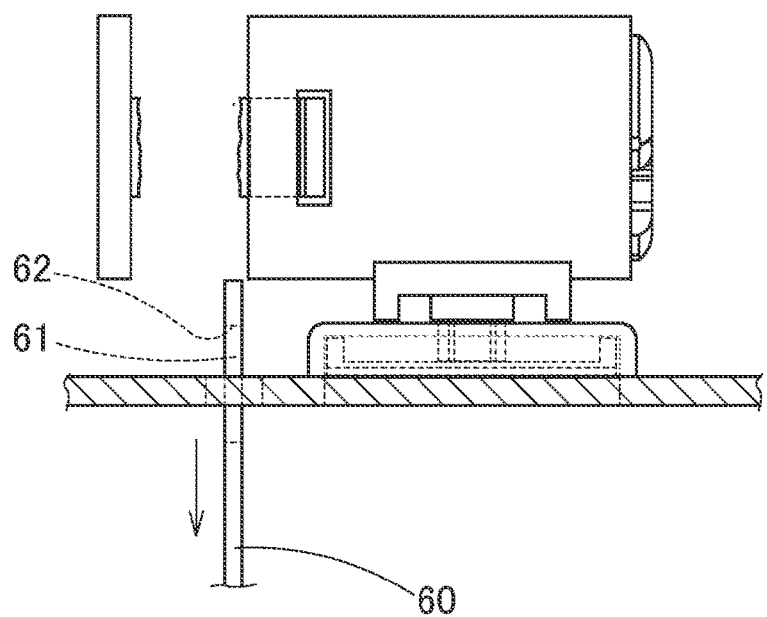
Figure 10A:
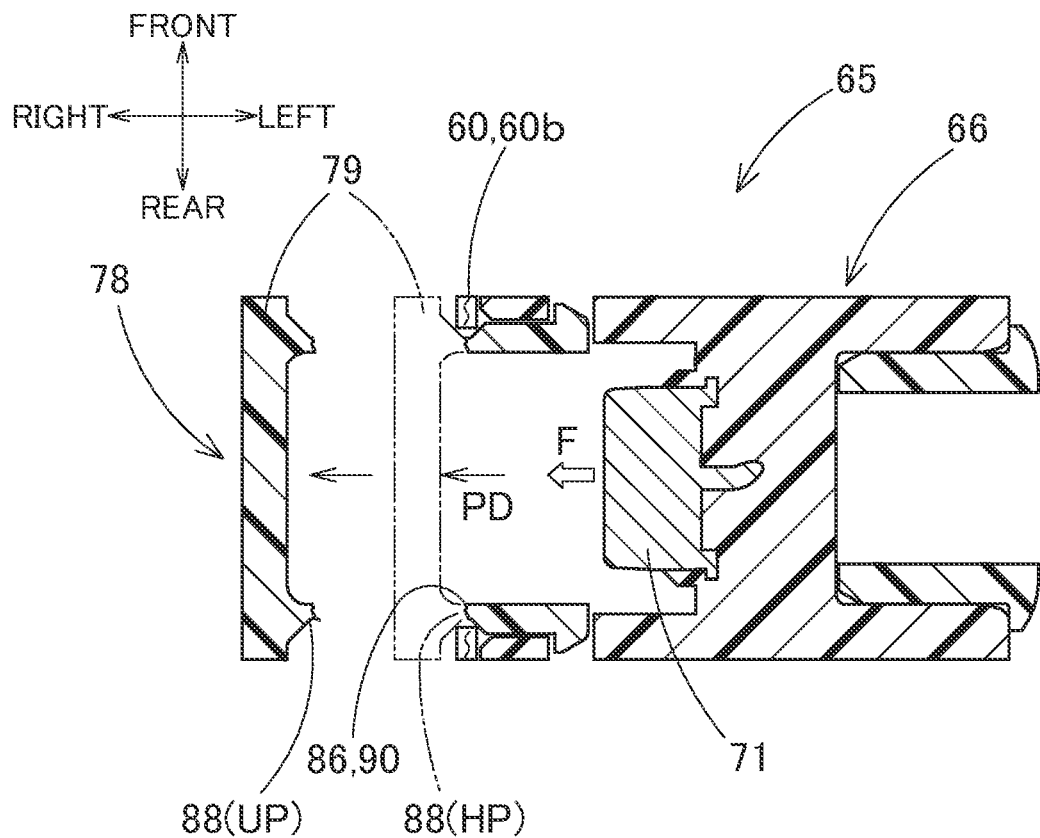
FIGS. 10A and 10B are schematic lateral sectional views showing states before and after the actuator operates.
Figure 10B:
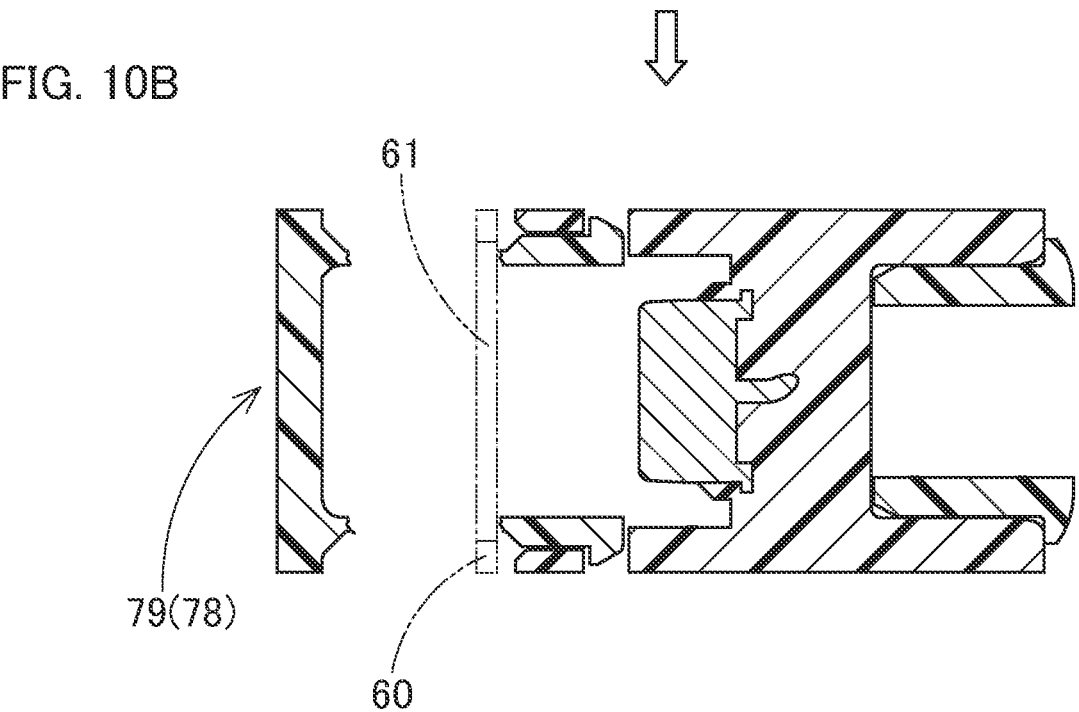
Figure 11A:
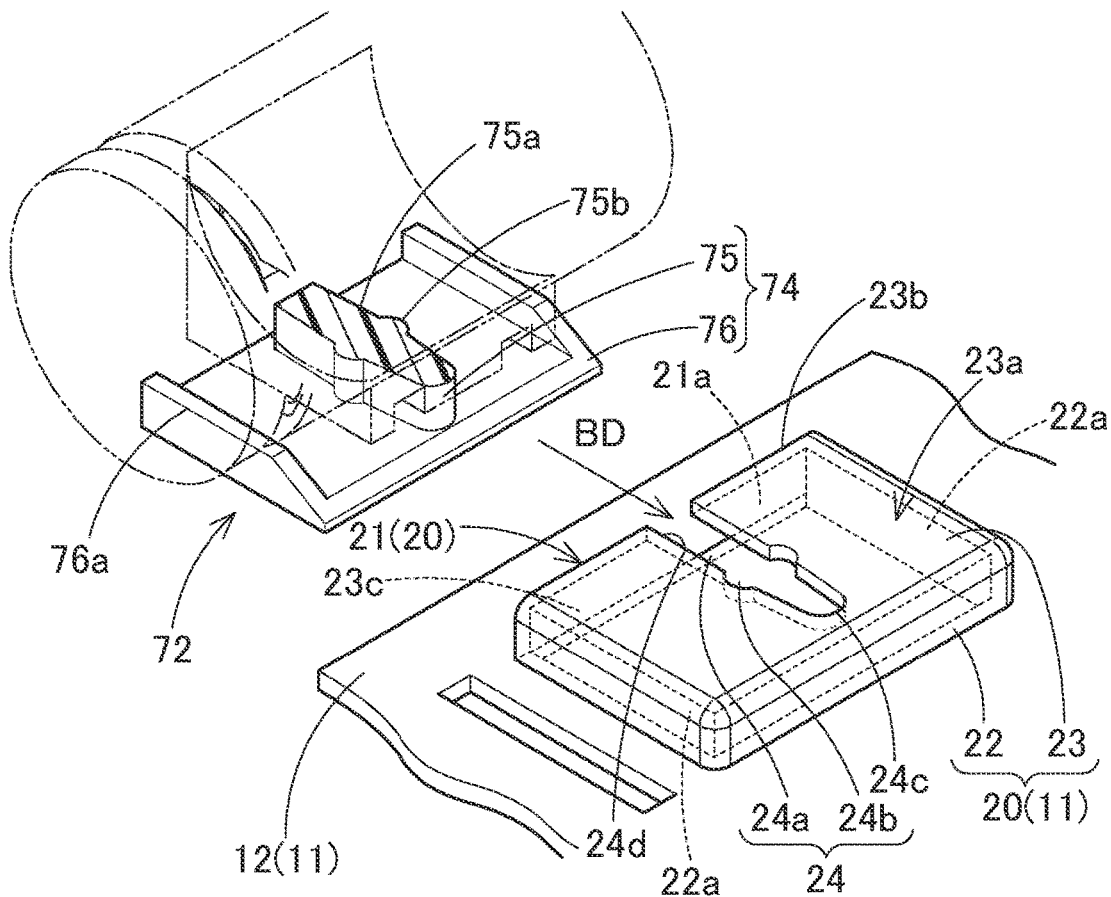
FIGS. 11A and 11B are schematic perspective views illustrating states of attaching the actuator to the attachment base.
Figure 11B:
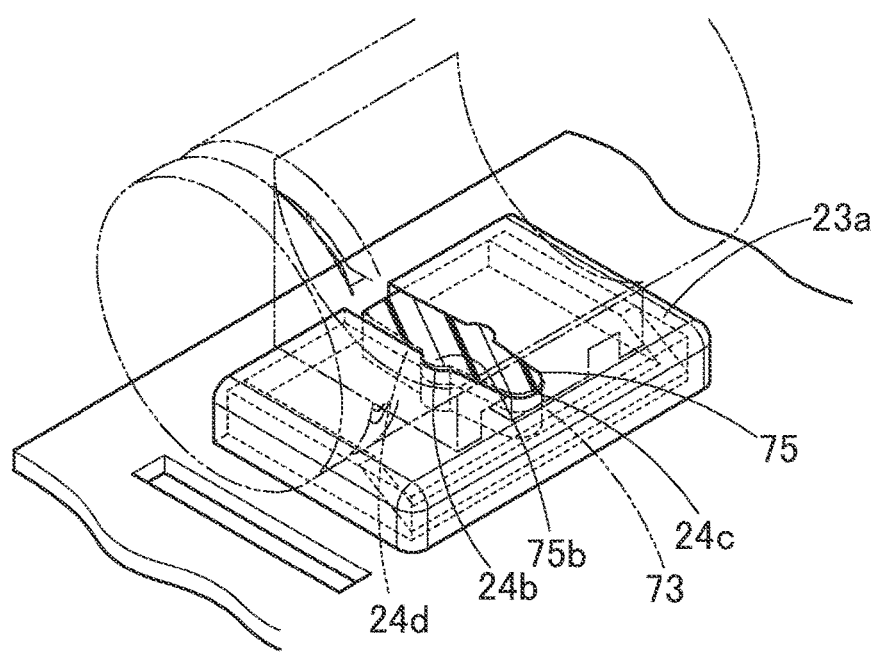
Figure 12A:
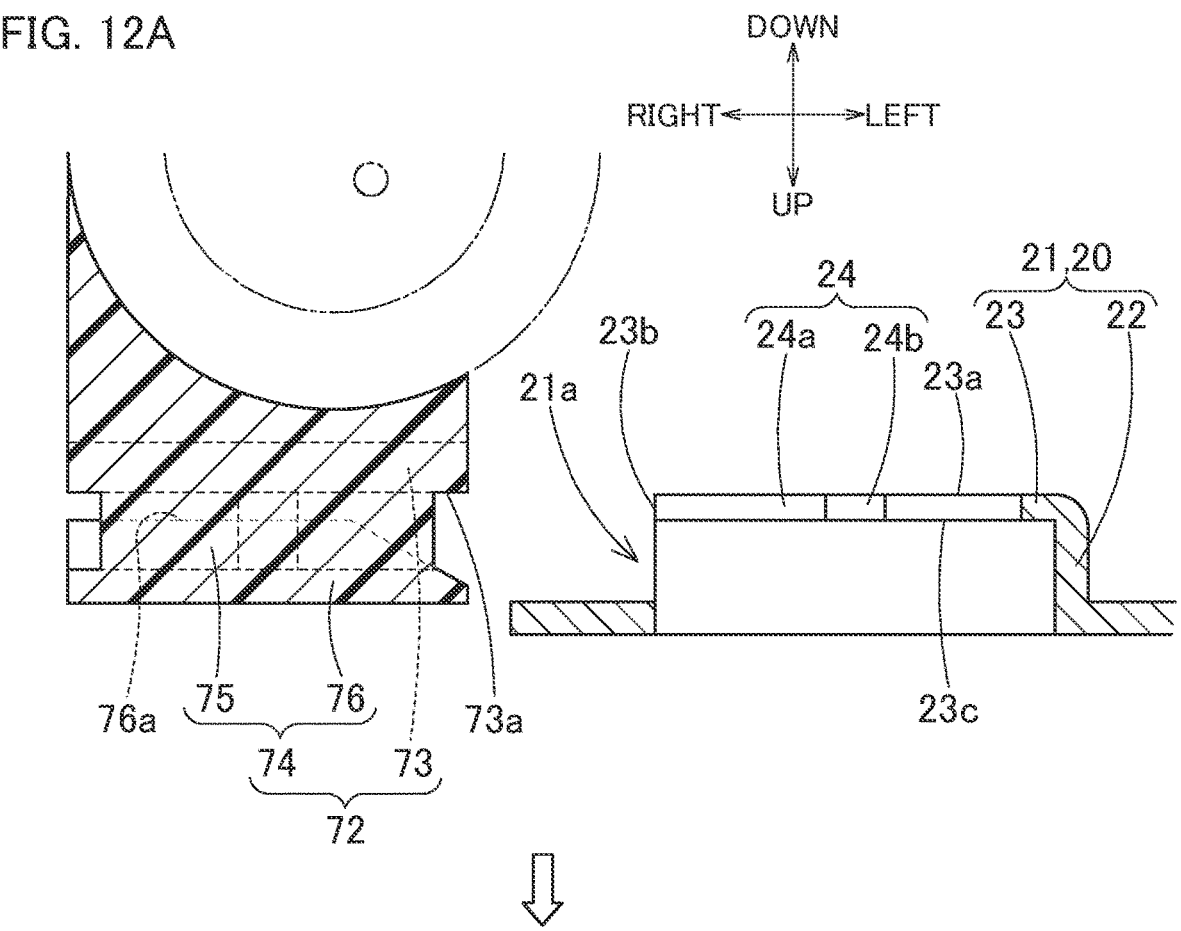
FIGS. 12A and 12B are schematic longitudinal sectional views illustrating states of attaching the actuator to the attachment base.
Figure 12B:
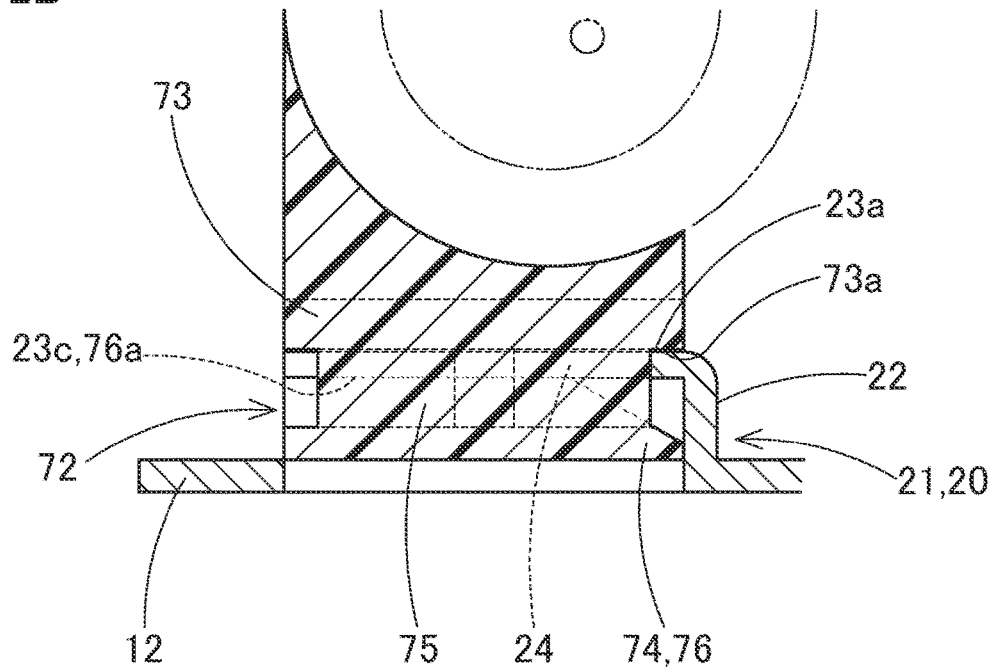
Figure 13A:
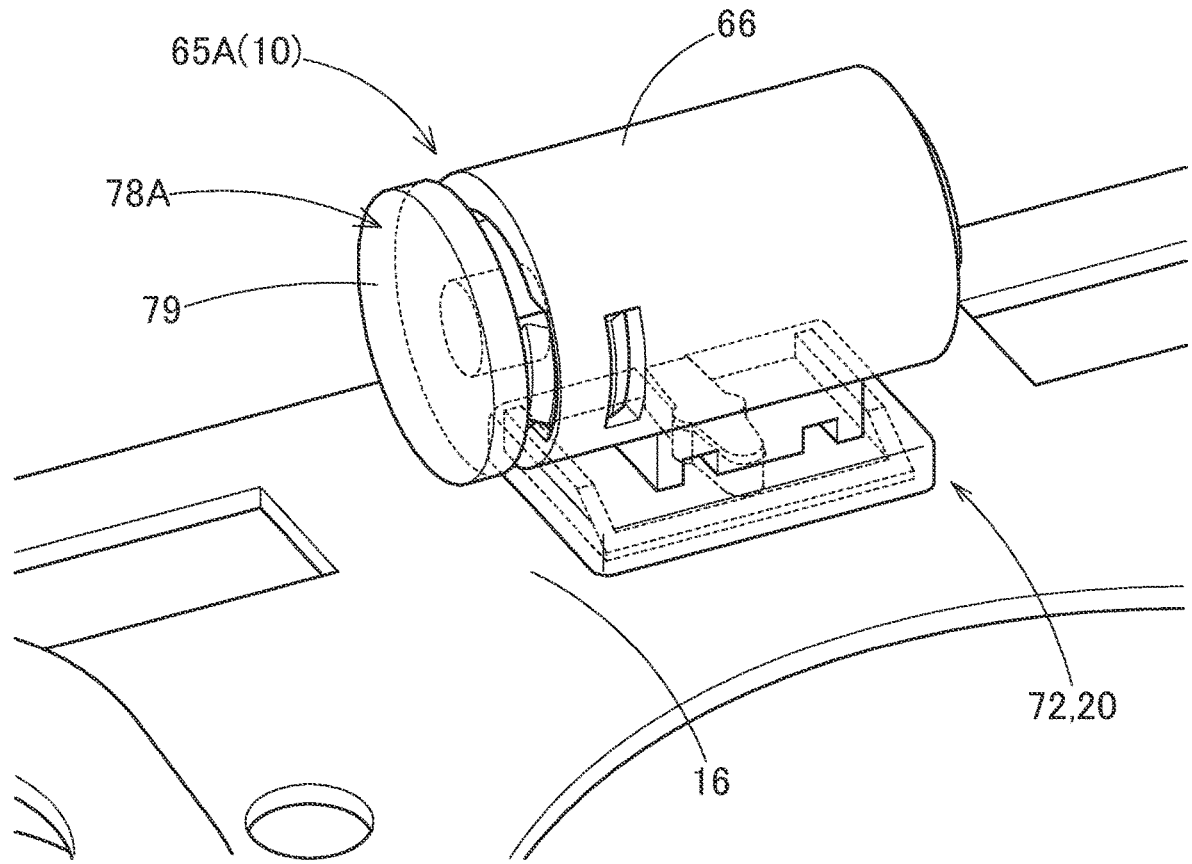
FIGS. 13A and 13B are schematic perspective views of an actuator according to a modification, together showing a state wherein a holding portion of a cap and a coupling member are coupled.
Figure 13B:
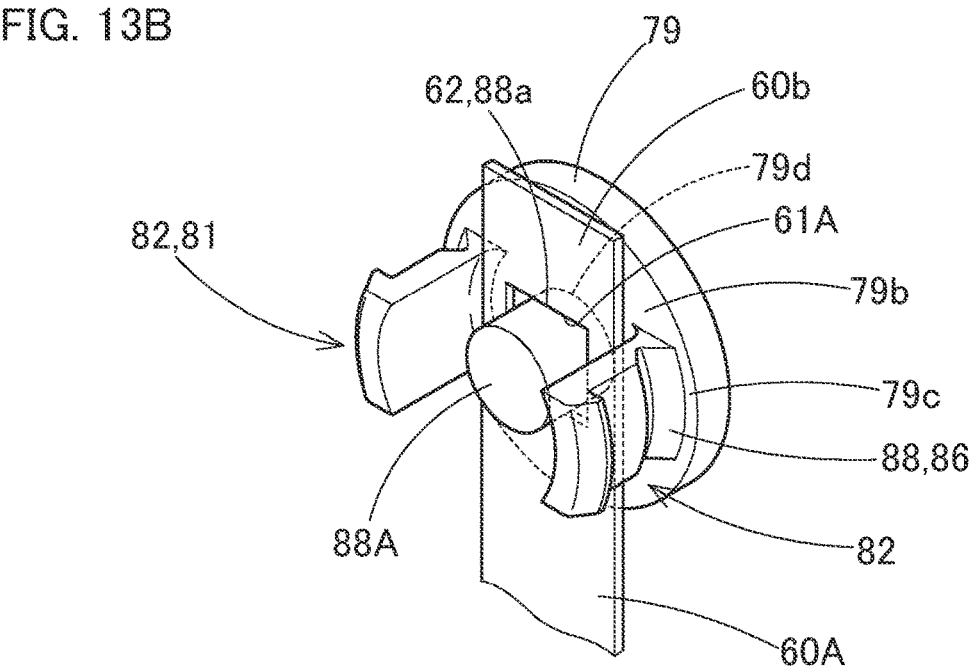

The blocking member 56 configuring the internal pressure adjusting mechanism 55 is disposed on a peripheral edge of the exhaust hole 48 on an inner peripheral face 40*b* side of the airbag 40. The blocking member 56 is formed of the same kind of fabric (a sheet material) having flexibility, such as a polyamide, as the airbag 40. As shown in FIG. 4, the blocking member 56 is a trapezoidal member that, in a state of blocking the exhaust hole 48, extends from the peripheral edge of the exhaust hole 48 toward the insertion hole 49 side to a rear thereof on the inner peripheral face 40*b* side of the airbag 40. In the blocking member 56, a base portion 60*a* of the blocking tether 60 is sewn to a leading end portion 56*b* extended rearward, and a base portion 56*a* side extending forward is sewn to the vehicle body side wall portion 43 of the airbag 40 in such a way as to cover the exhaust hole 48.

In a state wherein the leading end portion 60*b* side of the blocking tether 60 is pulled by being held by the actuator 65, an intermediate portion 56*c* between the base portion 56*a* of the blocking member 56 and the leading end portion 56*b* covers the exhaust hole 48 on the inner peripheral face 40*b* side of the airbag 40. Because of this, an intermediate portion 56*c* is pressed against the peripheral edge of the exhaust hole 48 by pressure of an inflating gas G when the airbag 40 inflates, the exhaust hole 48 is in a blocked state, and leaking of the inflating gas G from the exhaust hole 48 can be prevented (refer to a blocking member 56A indicated by a two-dot chain line in FIG. 3). Meanwhile, when the holding of the blocking tether 60 by the actuator 65 is released, the intermediate portion 56*c* is pressed by the pressure of the inflating gas G, slips through the exhaust hole 48, and is pushed out to an outer peripheral face 40*a* side of the airbag 40 (refer to a blocking member 56B indicated by a two-dot chain line in FIG. 3). Because of this, the exhaust hole 48 is in an opened state, and the inflating gas G can be discharged from the exhaust hole 48.

The blocking tether 60 is a strip-form member formed of a fabric (a sheet material) having flexibility, such as a polyamide. The base portion 60*a*, which is one end portion of the blocking tether 60, is coupled to the leading end portion 56*b* of the blocking member 56, and a leading end portion 60*b*, which is another end portion, is held by the actuator 65. A holding hole 61 opened in an approximately quadrilateral form is formed in the leading end portion 60*b* (refer to FIGS. 7A and 7B). A holding portion 88 of the actuator 65 is inserted into the holding hole 61. The blocking tether 60 is held by the actuator 65 owing to the holding portion 88 of the actuator 65 being inserted into and engaged by the holding hole 61, and the holding by the actuator 65 is released by the holding portion 88 being removed from the holding hole 61. Also, the intermediate portion 60*c* of the blocking tether 60 is inserted through the insertion hole 49 of the airbag 40, and the leading end portion 60*b* side is inserted through the insertion hole 16 of the attachment base 11. By so doing, the blocking tether 60 is inserted via the insertion hole 49 from the inner peripheral face 40*b* side (an interior) of the airbag 40 to an outer peripheral face 40*a* side (an exterior), and engaged with the holding portion 88 of the actuator 65.

As shown in FIGS. 6, 7A, 7B, and 8, the actuator 65 includes a main body portion 66 attached to the attachment base 11, a squib 71 disposed in an interior on the base portion 66*a* side, which is one end portion of the main body portion 66, and a cap 78 attached to the leading end portion 66*b* side, which is another end side of the main body portion 66, in such a way as to oppose the squib 71.

An external form of the main body portion 66 is cylindrical, and a connector 70 to which a signal line (not shown) for inputting an operation signal into the squib 71 is joined is provided on the base portion 66*a* side. When operating, the squib 71 discharges a combustion gas F by causing an internal explosive to ignite. Also, the main body portion 66 includes a squib housing portion 67 on the base portion 66*a* side, and a cylindrical fitting recessed portion 68 for attaching the cap 78 on the leading end portion 66*b* side.

The fitting recessed portion 68 is configured in such a way that a cylindrical peripheral wall portion 68*a* extends from a periphery of the squib 71, and an engagement recessed portion 69, in which an engagement protruding portion 84 of the cap 78 is inserted and engaged, is formed in such a way as to penetrate inner and outer peripheries in positions in two places having point symmetry. Two engagement recessed portions 69 are formed in positions opposed in a front-back direction in such a way as to follow the base main body portion 12 in the peripheral wall portion 68*a*, and opening forms thereof are quadrilateral.

Also, a main body side attachment portion 72 attached to the base side attachment portion 20 provided on the lower face 12*b* of the base main body portion 12 is provided in the peripheral wall portion 68*a* of the main body portion 66. The main body side attachment portion 72 includes a base portion 73, which extends upward from the peripheral wall portion 68*a*, and an attachment protruding portion 74, which extends upward from the base portion 73. The attachment protruding portion 74 includes an attachment shaft portion 75, which extends upward from the base portion 73, and a plate-form engagement plate portion 76, which extends to both left and right sides at an upper end of the attachment shaft portion 75. A transverse section of the attachment shaft portion 75 is equivalent to (slightly smaller than) an opening form of the insertion groove portion 24 of the base side attachment portion 20, and a projection portion 75*b* that fits into the engagement portion 24*b* of the insertion groove portion 24 is provided in such a way as to protrude from both left and right faces of a general portion 75*a*.

When the main body side attachment portion 72 is attached to the base side attachment portion 20, the attachment shaft portion 75 is inserted into the insertion groove portion 24 while the engagement plate portion 76 is inserted into the insertion aperture 21*a* of the base side attachment portion 20, causing the projection portion 75*b* to engage with the engagement portion 24*b* of the insertion groove portion 24. By so doing, the main body side attachment portion 72 can be attached to the base side attachment portion 20. The actuator 65 after assembly is completed is in a position at the exterior of the airbag 40, disposed on the lower face 12*b* side of the base main body portion 12 of the attachment base 11.

When the main body side attachment portion 72 of the actuator 65 is attached to the base side attachment portion 20 of the base main body portion 12 of the attachment base 11, the actuator 65 is held in a state positioned in a front-back direction, an up-down direction, and a left-right direction with respect to the attachment base 11. That is, with regard to front-back direction positioning, a position of the attachment shaft portion 75 is regulated by an insertion end 24*c* of the insertion groove portion 24, whereby movement of the actuator 65 in an insertion direction BD (a backward direction) of the main body side attachment portion 72 is regulated. Also, the projection portions 75*b*, 75*b* of the attachment shaft portion 75 are engaged with the engagement portion 24b of the insertion groove portion 24, whereby movement of the actuator 65 in a direction opposite to the insertion direction BD (a forward direction) is regulated. With regard to up-down direction positioning, a position of a regulating face 73a on an upper face side of the base portion 73 on the main body portion 66 side is regulated by a regulating face 23a on a lower face side of the lateral wall portion 23 of the base side attachment portion 20, whereby movement of the actuator 65 in an upward direction is regulated. Also, a position of a regulating face 76a on a lower face side of the engagement plate portion 76 of the main body side attachment portion 72 is regulated by a regulating face 23c on an upper face side of the lateral wall portion 23 on a peripheral edge of the insertion groove portion 24 of the base side attachment portion 20, whereby movement of the actuator 65 in a downward direction is regulated. With regard to left-right direction positioning, movement of the actuator 65 in the left-right direction is regulated by a position of the attachment shaft portion 75 being regulated by an inner peripheral face 24d of the insertion groove portion 24, and a position of the engagement plate portion 76 being regulated by left and right inner side faces 22a of the peripheral wall portion 22.

The cap 78 is made of a synthetic resin such as a polyamide with which a reinforcing filler is mixed, in the same way as the main body portion 66 excepting the squib 71 and the connector 70, and is provided in such a way as to close off the leading end portion 66b side of the main body portion 66. The cap 78 includes a disc-form ceiling portion 79, which is subjected to pressure of the combustion gas F emitted when the squib 71 operates, and a fitting protruding portion 81 provided in such a way as to extend to the main body portion 66 side from the ceiling portion 79. By the fitting protruding portion 81 being inserted into the fitting recessed portion 68 provided on the leading end portion 66b side of the main body portion 66, the cap 78 is attached to the main body portion 66, and movement of the cap 78 in a removal direction opposite to the insertion direction is regulated.

Also, the fitting protruding portion 81 includes a fitting main body portion 82, which is fitted to the fitting recessed portion 68 of the main body portion 66, and the holding portion 88, which holds the leading end portion 60b of the blocking tether 60 by engaging an inner peripheral edge 62 side of the holding hole 61 of the blocking tether 60 when fitting to the main body portion 66. When held by the holding portion 88, the blocking tether 60 is in a state wherein the holding portion 88 is inserted into the holding hole 61, and is disposed between the ceiling portion 79 and another end (an end face 68b of the peripheral wall portion 68a) of the main body portion 66.

Two of the fitting main body portion 82 are provided, and each includes a leg portion 83 extending from the ceiling portion 79, and the engagement protruding portion 84, which is disposed on a leading end side of the leg portion 83, and is engaged with the engagement recessed portion 69 (engagement hole portion) provided in the peripheral wall portion 68a of the fitting recessed portion 68 of the main body portion 66.

The holding portion 88 is provided in the leg portion 83 of each fitting main body portion 82. Specifically, the holding portion 88 is provided in a position on a base portion 83a side near the ceiling portion 79, rather than on a leading end portion 83b side in proximity to the engagement protruding portion 84, between the engagement protruding portion 84 and the ceiling portion 79 in the leg portion 83. A side face (lower face) side of a region of the holding portion 88 in which a fragile portion 86, to be described hereafter, is provided forms an engagement edge 88a that holds the inner peripheral edge 62 of the holding hole 61 of the blocking tether 60.

The cap 78 includes a movement permitting unit 90 that, when the squib 71 operates, the combustion gas F is ejected, and the ceiling portion 79 is subjected to the pressure of the combustion gas F, causes the ceiling portion 79 to move, and causes the holding portion 88 extending from the ceiling portion 79 to move from a holding position HP, wherein the holding portion 88 is inserted into the holding hole 61 of the blocking tether 60, to a holding released position UP, wherein the holding portion 88 is removed from the holding hole 61. The movement permitting unit 90 is provided in the leg portion 83 in each fitting main body portion 82, and is configured of the fragile portion 86, which causes the leg portion 83 to divide to the ceiling portion 79 side and the engagement protruding portion 84 side when the ceiling portion 79 is subjected to the pressure of the combustion gas F. The fragile portion 86 is a thin region formed by a V-shaped groove recessed from an outer surface side of the leg portion 83 being provided.

When assembling the airbag device 10 and mounting the airbag device 10 in a vehicle, firstly, the retainer 33 is placed inside the airbag 40 in such a way as to cause the bolts 34 of the retainer 33 to protrude from the attachment holes 45. Next, the airbag 40 is folded, and the airbag 40 is wrapped in a predetermined unfolding preventing material in order that the airbag 40 does not become unfolded. The leading end portion 60b side of the blocking tether 60, which is coupled to the blocking member 56 attached to the inner peripheral face 40b side of the airbag 40, is extruded from the insertion hole 49, and is also withdrawn from the unfolding preventing material.

Next, the airbag 40 is placed on the attachment base 11, while causing the bolts 34 of the retainer 33 to protrude from the attachment base 11, and extruding the leading end portion 60b side of the blocking tether 60 to the back face 12b side of the attachment base 11 from the insertion hole 16. Further, the main body portion 26a of the inflator 26 is inserted into the insertion hole 13 from below, the bolts 34 of the retainer 33 are caused to penetrate the flange portion 26c, and unshown nuts are fastened to the bolts 34. By so doing, the airbag 40 and the inflator 26 can be attached to the attachment base 11. The main body side attachment portion 72 of the actuator 65 is attached in advance to the base side attachment portion 20 of the attachment base 11, and the main body portion 66 in which the squib 71 of the actuator 65 is provided is attached.

Next, each engagement main body portion 82 of the fitting protruding portion 81 of the cap 78 of the actuator 65 is inserted into and fitted in the fitting recessed portion 68 of the main body portion 66 of the actuator 65, while being inserted into the holding hole 61 of the blocking tether 60. By so doing, the engagement protruding portion 84 of the engagement main body portion 82 is engaged in the engagement recessed portion 69 of the main body portion 66, and the blocking tether 60 is held by the actuator 65, while the cap 78 is attached to the main body portion 66.

Next, the attachment base 11 is covered with the airbag cover 28, and the engagement legs (not shown) of the airbag cover 28 are caused to engage with the engagement holes 14 of the attachment base 11, whereby the airbag cover 28 is attached to the attachment base 11. By so doing, the airbag device 10 can be assembled. A state wherein the blocking tether 60 is caused to be held by the actuator 65 is an initial state of the airbag device 10, and the blocking member 56 in this state blocks the exhaust hole 48 on the inner peripheral face 40*b* side of the airbag 40.

Also, the airbag device 10 can be mounted in the vehicle by the engagement legs 18 being caused to engage one each with the attachment portions 5 of the steering wheel main body 1, which is fastened in advance to the steering shaft SS, and the airbag device 10 being attached to the steering wheel main body 1. At this time, an operation signal line extending from the control device 100 is connected to the inflator 26 or the actuator 65.

The driver's seat airbag device 10 of the embodiment is such that, firstly, a collision of the vehicle is detected by the collision detecting sensor 101, and a signal is input into the control device 100 from the collision detecting sensor 101, whereby the inflator 26 is caused to operate by the control device 100. Because of this, the inflating gas G is discharged from the gas discharge port 26*b* of the inflator 26, and the airbag 40 inflates owing to the inflating gas G. The inflated airbag 40 pushes and opens the door portions 29*a*, 29*a* of the airbag cover 28, protrudes from the airbag cover 28, and covers an upper face RP side of the ring portion R, as shown by two-dot chain lines in FIGS. 1, 2, and 3.

At this time, when the control device 100 determines, based on a signal output from the position detecting sensor 102 or the weight detecting sensor 103, that the internal pressure of the airbag 40 is not to be reduced, the control device 100 does not cause the actuator 65 to operate. Because of this, the actuator 65 does not release the holding of the blocking tether 60, meaning that the blocking member 56 maintains the state of blocking the exhaust hole 48. That is, in a state wherein the exhaust hole 48 is blocked, the actuator 65 holds the leading end portion 60*b* of the blocking tether 60, the blocking member 56 is pulled by the blocking tether 60, and the blocking member 56 covers and blocks the exhaust hole 48, while being pressed by the inflating gas G to the inner peripheral face 40*b* side of the airbag 40 on the peripheral edge of the exhaust hole 48 (refer to the blocking member 56A indicated by a two-dot chain line in FIG. 3).

Also, when the control device 100 determines, based on a signal output from the position detecting sensor 102 or the weight detecting sensor 103, that the internal pressure of the airbag 40 is to be reduced when the inflator 26 operates, the control device 100 causes the actuator 65 to operate. On the squib 71 causing the combustion gas F to be emitted when the actuator 65 operates, the ceiling portion 79 of the cap 78 is subjected to the pressure of the combustion gas F, whereby the fragile portion 86 divides, as shown in FIGS. 6, 8, 9A, 9B, 10A, and 10B. A direction PD in which the ceiling portion 79 is pressed by the pressure of the combustion gas F is a direction in which the holding portion 88 is removed from the holding hole 61, meaning that together with the ceiling portion 79 moving in a direction away from the main body portion 66, the holding portion 88 moves from the holding position HP, wherein the holding portion 88 is inserted into the holding hole 61 of the blocking tether 60, to the holding released position UP, wherein the holding portion 88 is removed from the holding hole 61. Because of this, the holding of the blocking tether 60 by the actuator 65 is released, the state wherein the blocking member 56 is pulled by the blocking tether 60 is ended, the blocking member 56 slips through the discharge hole 48 owing to the pressure of the inflating gas G, and there is a shift from a state wherein the exhaust hole 48 is blocked to a state wherein the exhaust hole 48 is opened (refer to the blocking member 56B indicated by a two-dot chain line in FIG. 3). As a result of this, the inflating gas G is discharged from the exhaust hole 48, and the internal pressure of the airbag 40 can be reduced.

In this way, according to the configuration of the embodiment, a holding of the blocking tether 60 by the actuator 65 can be released, simply by the fitting main body portion 82 being caused to break by a pressing force of the combustion gas F, by providing the movement permitting unit 90. In other words, the actuator 65 can release a holding of the blocking tether 60, with no need for a configuration wherein the holding portion 88 is caused to slide by securing airtightness of the combustion gas F. Because of this, according to the airbag device 10 of the embodiment, a holding of the blocking tether 60 by the actuator 65 can be released using a simple configuration.

Also, the fitting main body portion 82 includes the leg portion 83 extending from the ceiling portion 79, and the engagement protruding portion 84, which is disposed on the leading end portion 83*b* side of the leg portion 83, and is engaged with the engagement recessed portion 69 provided in the fitting recessed portion 68 of the main body portion 66. Further, the movement permitting unit 90 is the fragile portion 83, which is provided in the leg portion 83, and causes the leg portion 83 to divide to the ceiling portion 79 side and the engagement protruding portion 84 side when the ceiling portion 79 is subjected to the pressure of the combustion gas F. This means that by causing the ceiling portion 79 extended from the holding portion 88 to move, the holding portion 88 can be caused to move to the holding released position UP. Consequently, the holding portion 88 can be caused to move, thereby releasing the holding of the blocking tether 60, while a fitting strength (engagement strength) of the engagement protruding portion 84 with respect to the engagement recessed portion 69 of the main body portion 66 is increased, thereby attaching the cap 78 securely to the main body portion 66.

Also, the holding portion 88 of the actuator 65 is provided in the leg portion 83 of the fitting main body portion 82. By causing the holding portion 88 of the actuator 65 to double as the leg portion 83 in this way, the leg portion 83 itself is attached to the main body portion 66 of the actuator 65 while causing the leg portion 83 to be inserted into the holding hole 61 of the blocking tether 60. Because of this, holding of the blocking tether 60 and attachment of the cap 78 to the main body portion 66 can be carried out approximately simultaneously, and work of assembling the actuator 65 can be carried out efficiently.

Also, the holding portion 88 of the actuator 65 and the fragile portion 86 are provided in positions in proximity to the ceiling portion 79 side between the engagement protruding portion 84 and the ceiling portion 79 in the leg portion 83 of the fitting main body portion 82. This means that when the fragile portion 86 divides, the ceiling portion 79 that regulates the peripheral edge of the holding hole 61 of the blocking tether 60 immediately separates from the blocking tether 60, and there is no longer a regulated region of the peripheral edge of the holding hole 61, because of which the holding portion 88 is more easily promptly removed from the holding hole 61. Consequently, holding of the blocking tether 60 by the actuator 65 can be released smoothly. When the aforementioned point is not taken into consideration, a configuration wherein the fragile portion 86 or the holding portion 88 is provided in a position in proximity to the engagement protruding portion 84 on the leading end portion 83*b* side of the leg portion 83 of the fitting main body portion 82, or in a vicinity of an intermediate point between the base portion 83a of the leg portion 83 and the leading end portion 83b, may be adopted.

Also, the actuator 65 is provided at the exterior of the airbag 40. This means that even when the ceiling portion 79 and the like on the cap 78 side, which have separated from the main body portion 66 side of the actuator 65, scatter after the airbag device 10 operates, damage to the airbag 40 caused by the scattered ceiling portion 79 and the like can be restricted.

Also, the attachment base 11 includes the base main body portion 12, to which the airbag 40 is attached and which has the insertion hole 16 through which the leading end portion 60b side of the blocking tether 60 is inserted, and the base side attachment portion 20, which is provided on the back face 12b side of the base main body portion 12 to which the airbag 40 is attached, and to which the actuator 65 can be attached. Further, the main body portion 66 of the actuator 65 includes the main body side attachment portion 72, which can be attached to the base side attachment portion 20, and the main body side attachment portion 72 is caused to move in approximate parallel with the back face 12b side of the base main body portion 12, and is configured in such a way as to be attachable to the base side attachment portion 20. Because of this, as shown in FIGS. 11A, 11B, 12A, and 12B, the actuator 65 can be attached to the attachment base 11 without separating from the back face 12b side of the base main body portion 12 of the attachment base 11, meaning that the actuator 65 can easily be attached to the attachment base 11. Also, as the actuator 65 is attached to the back face 12b side of the base main body portion 12, the blocking tether 60 can be held accurately, without causing the blocking tether 60 to move, even when the blocking tether 60 being held by the actuator 65 is pulled strongly to the front face 12a side of the base main body portion 12 in association with inflation of the airbag 40. Assembly of the actuator 65 and the attachment base 11 is not limited to the configuration of the embodiment, provided that movement of the actuator 65 in the front-back direction, the up-down direction, and the left-right direction after assembly is completed can be regulated. That is, for example, an attachment recessed portion may be provided on the main body portion 66 side of the actuator 65, and an attachment protruding portion may be provided on the base main body portion 12 side.

Figure 14A:
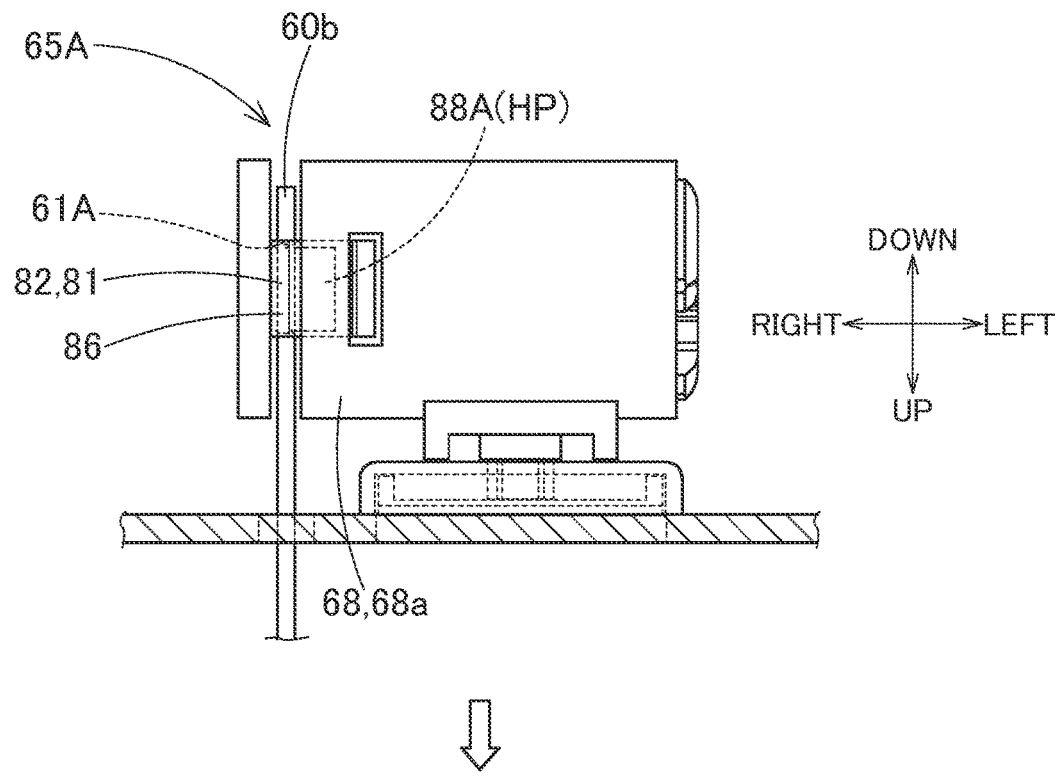
FIGS. 14A and 14B are schematic front views showing states before and after the actuator shown in FIGS. 13A and 13B operates.
Figure 14B:
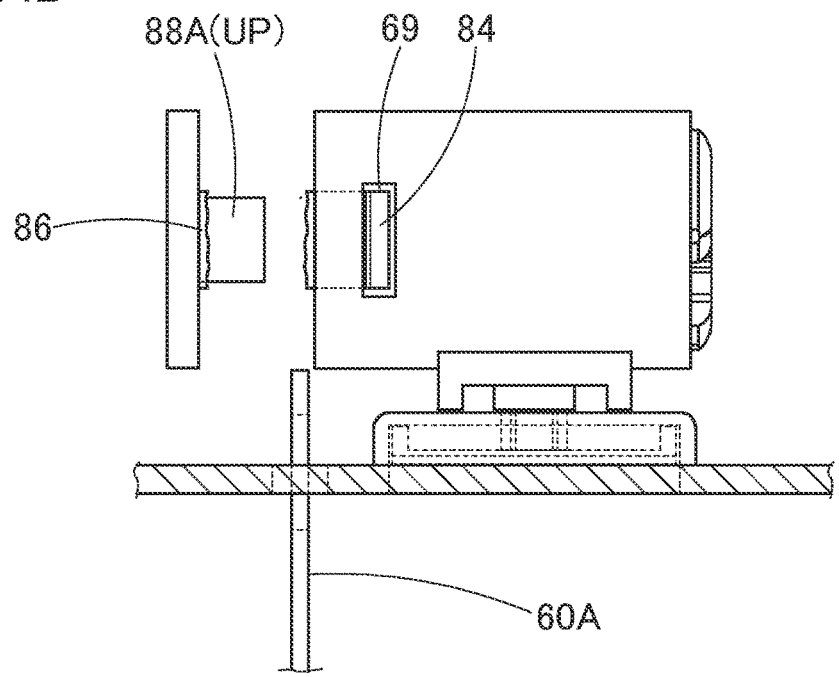
Figure 15A:
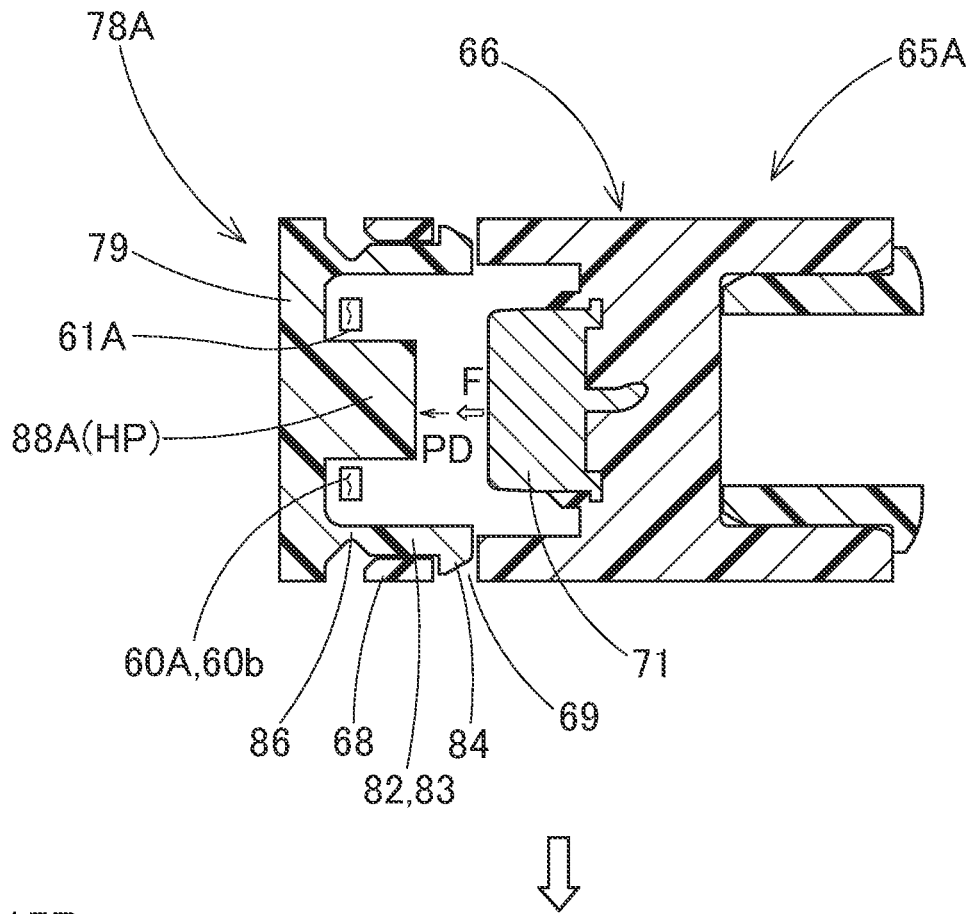
FIGS. 15A and 15B are schematic lateral sectional views showing states before and after the actuator shown in FIGS. 13A and 13B operates.
Figure 15B:
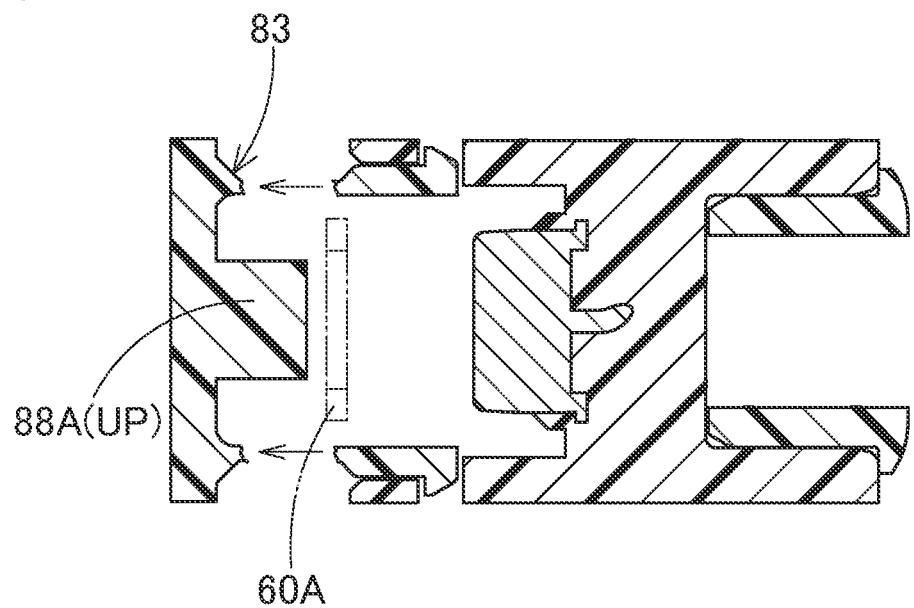
Figure 16A:
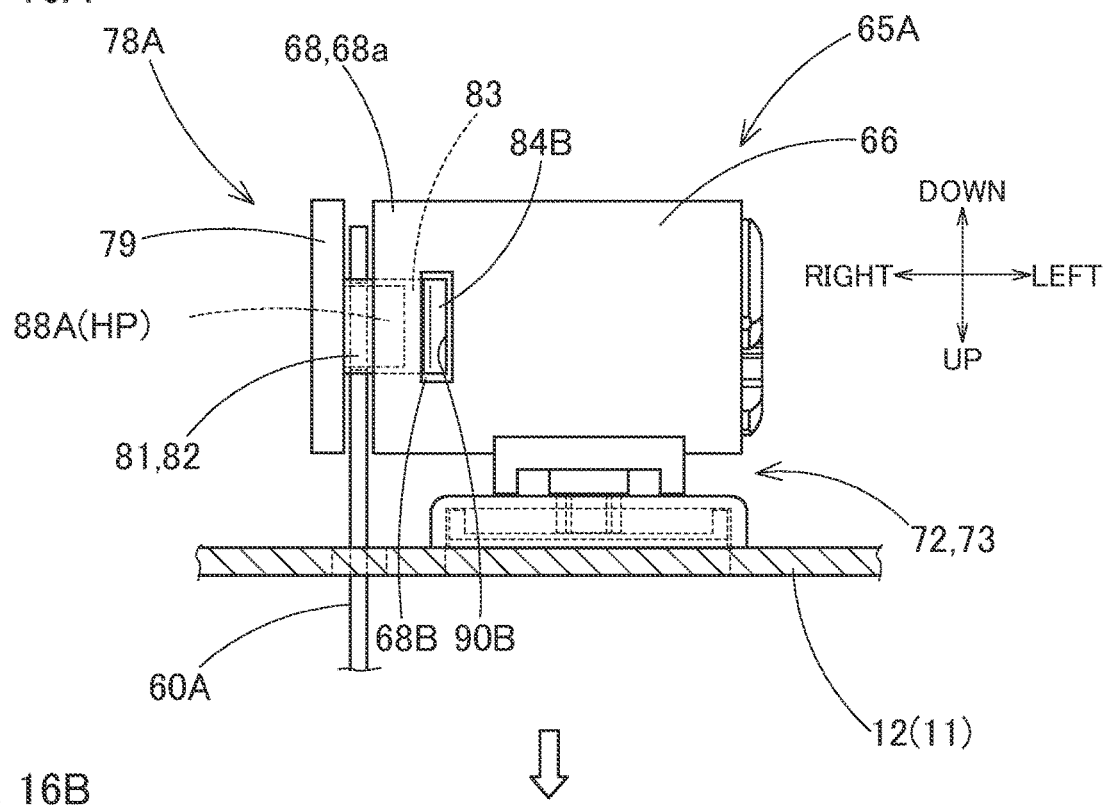
FIGS. 16A and 16B are schematic front views showing states before and after an actuator according to a modification operates.
Figure 16B:
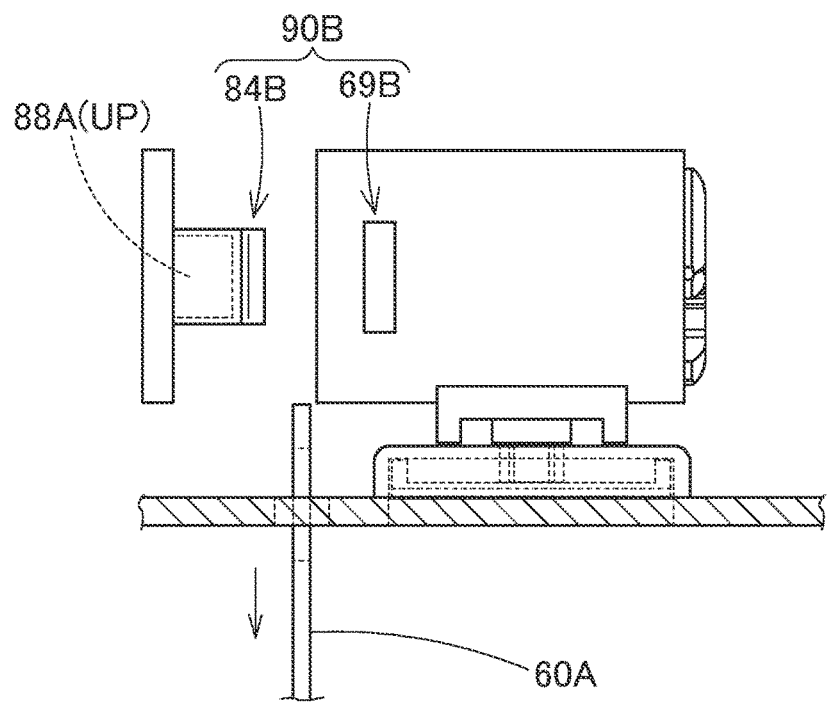
Figure 17A:
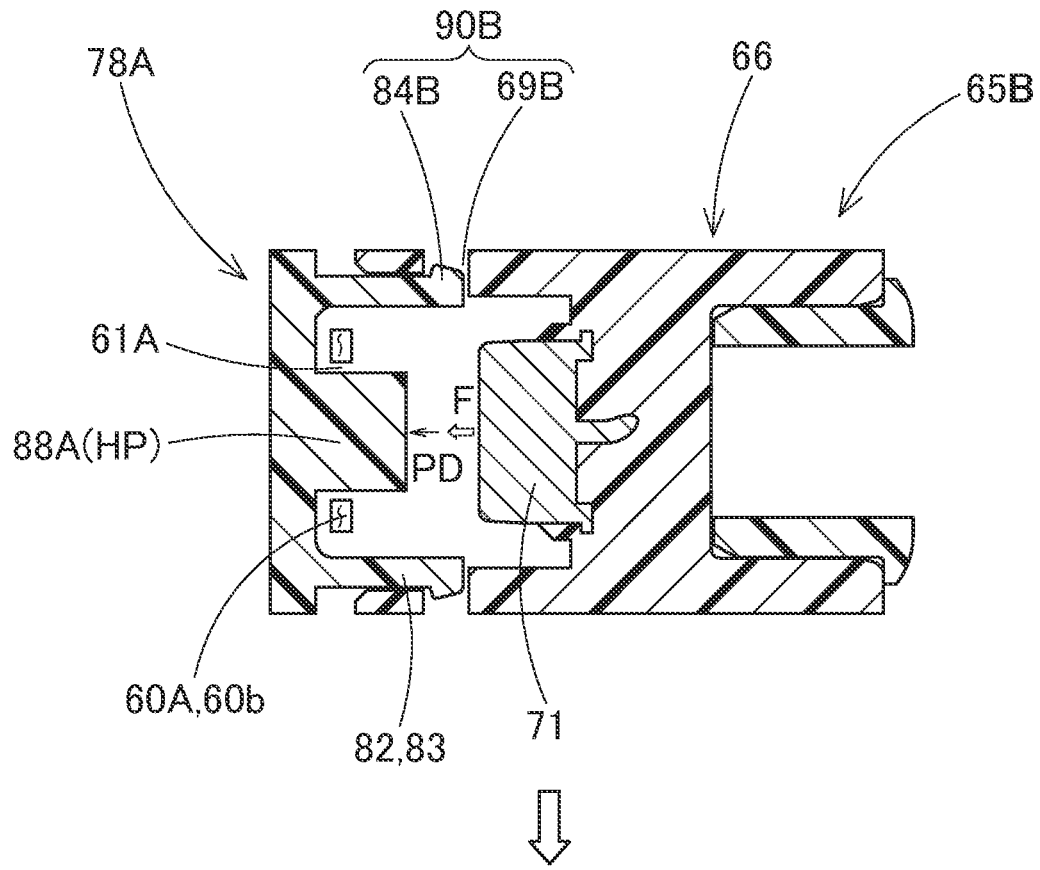
FIGS. 17A and 17B are schematic lateral sectional views showing states before and after the actuator shown in FIGS. 16A and 16B operates.
Figure 17B:
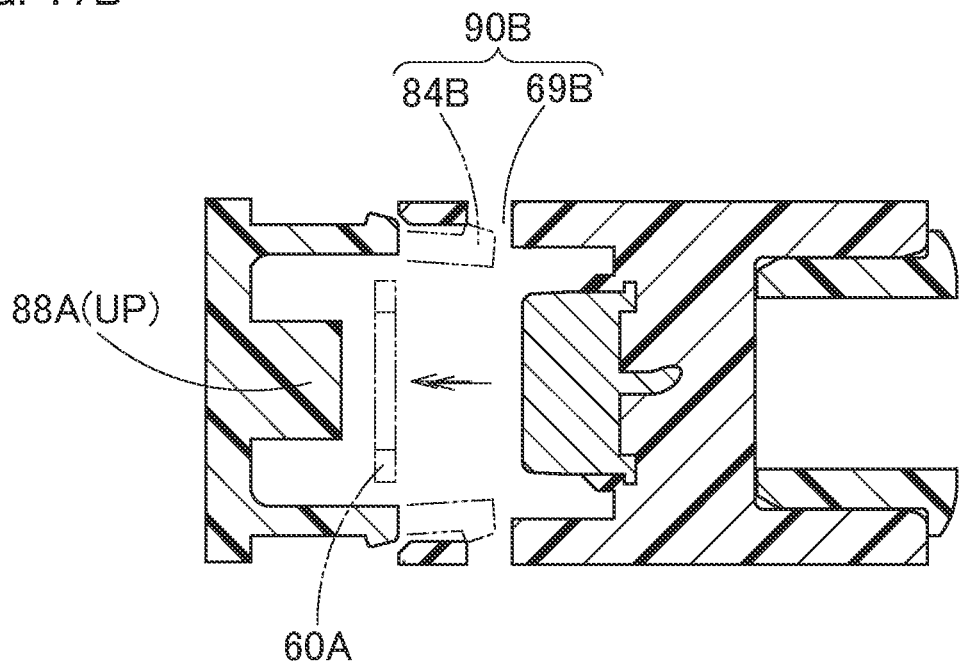

Also, in the embodiment, the holding portion 88 that holds the blocking tether 60 is provided in the leg portion 83 of the fitting main body portion 82, and caused to double as the fitting main body portion 82, but the invention is not limited to this. That is, a configuration wherein a holding portion 88A of the actuator 65 is provided in such a way as to extend from a position separate to the fitting main body portion 82 in the ceiling portion 79, as in the case of a cap 78A of an actuator 65A of the airbag device 10 shown in FIGS. 13A, 13B, 14A, 14B, 15A, and 15B, may be adopted. By so doing, there is no longer a need to consider providing the fitting main body portion 82 itself with strength to maintain a holding of a blocking tether 60A, because of which the cap 78 can be configured simply. Also, by an external form dimension of the holding portion 88A being smaller than an external form dimension of the fitting main body portion 82 of the cap 78, an opening area of a holding hole 61A of the blocking tether 60A can be reduced. Because of this, a width dimension of the blocking tether 60A can be reduced, and an insertion hole through which the blocking tether 60A of the airbag 40 is inserted can be reduced in size, meaning that leaking of inflating gas from the insertion hole of the airbag 40 can be restricted. In the airbag device 10 shown in FIGS. 13A, 13B, 14A, 14B, 15A, and 15B, the holding portion 88A is a cylindrical member protruding from a vicinity of a center 79d of a back face 79b of the ceiling portion 79, and is configured in such a way that an amount of protrusion is smaller than that of the fitting main body portion 82 having the fragile portion 86. On the fragile portion 86 fracturing, and the ceiling portion 79 separating from the main body portion 66, when the actuator 65A operates, the holding portion 88A moves from the holding position HP to the holding released position UP, and holding of the blocking tether 60A by the holding portion 88A is released (refer to FIGS. 14A, 14B, and 15).

Also, in the embodiment, a description has been given of a configuration wherein the fragile portion 86 is provided as the movement permitting unit 90 of the actuator 65, but the invention is not limited to this provided that the fitting main body portion 82 is configured to include the leg portion 83 extending from the ceiling portion 79, and the engagement protruding portion 84, which is disposed on the leading end portion 83b side of the leg portion 83 and is engaged with the engagement recessed portion 69 provided in the fitting recessed portion 68 of the main body portion 66. That is, for example, a movement permitting unit 90B may be configured of an engagement structure wherein an engagement protruding portion 84B separates from an engagement recessed portion 69B when the ceiling portion 79 is subjected to pressure of the combustion gas F, as in the case of the actuator 65B shown in FIGS. 16A, 16B, 17A, and 17B. That is, an engagement structure wherein a fitting strength of the fitting main body portion 82 caused to fit in the fitting recessed portion 68 of the main body portion 66 is a strength such that fitting can be released by a pressing force applied by the combustion gas F may be adopted. By so doing, the leg portion 83 of the fitting main body portion 82 can be configured without providing the fragile portion 86.

Although the invention has been described with the driver's seat airbag device 10 as an example in the embodiment, the invention is not limited to this. That is, provided that a configuration is such that an exhaust hole for adjusting internal pressure of an airbag when inflation is completed is provided, the invention can also be applied to another airbag device, such as a passenger seat airbag device.

What is claimed is:

1. An airbag device, comprising:
    an airbag that has a peripheral wall;
    a connecting member connected to the peripheral wall;
    a coupling member whose base portion side is coupled to the connecting member; and
    an actuator configured to hold a leading end portion side of the coupling member,
    wherein the actuator includes:
    a main body portion that is provided a squib on one end side inside; and
    a cap, attached to another end side of the main body portion in such a way as to oppose the squib, that includes a ceiling portion, which is provided in such a way as to close off the other end side of the main body portion and is subjected to pressure of a combustion gas emitted when the squib operates, and a fitting protruding portion, which extends to a main body portion side from the ceiling portion, and regulates movement of the cap in a removal direction opposite to an insertion direction by being inserted into a fitting recessed portion provided on the other end side of the main body portion, thereby attaching the cap to the main body portion, and wherein the fitting protruding portion includes:

a fitting main body portion fitted in the fitting recessed portion of the main body portion;

a holding portion that holds the leading end portion of the coupling member by being inserted into a held portion of the coupling member, the held portion being disposed between the ceiling portion and the other end of the main body portion when fitted to the main body portion; and a movement permitting unit that, when the ceiling portion is subjected to the pressure of the combustion gas, causes the ceiling portion to move, and causes the holding portion to move from a holding position, wherein the holding portion is inserted into the held portion of the coupling member, to a holding released position, wherein the holding portion is removed from the held portion.

2. The airbag device according to claim 1, wherein the fitting main body portion includes a leg portion, which extends from the ceiling portion, and an engagement protruding portion, which is disposed on a leading end side of the leg portion and is engaged with an engagement recessed portion provided in the fitting recessed portion of the main body portion, and the movement permitting unit of the actuator is a fragile portion, provided in the leg portion, that causes the leg portion to divide to a ceiling portion side and an engagement protruding portion side when the ceiling portion is subjected to the pressure of the combustion gas.

3. The airbag device according to claim 2, wherein the holding portion of the actuator is provided in the leg portion of the fitting main body portion.

4. The airbag device according to claim 3, wherein the holding portion and the fragile portion are provided in positions in proximity to the ceiling portion side between the engagement protruding portion and the ceiling portion in the leg portion of the fitting main body portion.

5. The airbag device according to claim 1, wherein the holding portion of the actuator is provided extending from a position separate to the fitting main body portion in the ceiling portion.

6. The airbag device according to claim 1, wherein the actuator is provided at an exterior of the airbag.

* * * * *